US 6,641,329 B1

(12) United States Patent
Clement

(10) Patent No.: US 6,641,329 B1
(45) Date of Patent: Nov. 4, 2003

(54) LIQUID CONTAINMENT/DIVERSION DIKE

(75) Inventor: Gerald M. Clement, Chestermere (CA)

(73) Assignee: Flood Services Inc., Bridgetown (BB)

( * ) Notice: Subject to any disclaimer, the term of this patent is extended or adjusted under 35 U.S.C. 154(b) by 0 days.

(21) Appl. No.: 09/667,160

(22) Filed: Sep. 21, 2000

Related U.S. Application Data

(63) Continuation-in-part of application No. 09/622,013, filed as application No. PCT/CA99/00121 on Feb. 13, 1998.

(30) Foreign Application Priority Data

Feb. 13, 1998 (CA) .............................................. 2229525

(51) Int. Cl.[7] ................................................. E02B 7/00
(52) U.S. Cl. ....................................... 405/115; 405/170
(58) Field of Search ............................ 405/21, 52, 80, 405/107, 110, 111, 115; 383/3, 121.1; 114/61.25; 441/45; 52/2.19

(56) References Cited

U.S. PATENT DOCUMENTS

| 2,609,666 A | 9/1952 | Mesnager |
| 3,246,474 A | 4/1966 | Mesnager |
| 3,355,851 A | 12/1967 | Imbertson et al. |
| 3,373,568 A | 3/1968 | Hornbostel, Jr. |
| 3,465,530 A | 9/1969 | Renfro |
| 3,834,167 A | 9/1974 | Tabor |
| 3,855,800 A | 12/1974 | Ganzinotti |
| 3,957,098 A | 5/1976 | Hepworth et al. |
| 4,279,540 A | 7/1981 | Suga et al. |
| 4,299,514 A | 11/1981 | Muramatsu et al. |
| 4,309,851 A | * 1/1982 | Flagg .......................... 446/110 |
| 4,314,744 A | 2/1982 | Moodie |
| 4,501,788 A | 2/1985 | Clem |
| 4,555,201 A | 11/1985 | Paoluccio |
| 4,690,585 A | 9/1987 | Holmberg |
| 4,729,691 A | * 3/1988 | Sample ......................... 405/21 |
| 4,784,520 A | 11/1988 | Stevens |
| 4,799,821 A | 1/1989 | Brodersen |
| 4,966,491 A | 10/1990 | Sample |
| 4,981,392 A | 1/1991 | Taylor |
| 5,040,919 A | 8/1991 | Hendrix |
| 5,059,065 A | 10/1991 | Doolaege |
| 5,125,767 A | 6/1992 | Dooleage |
| 5,645,373 A | 7/1997 | Jenkins |
| 5,857,806 A | 1/1999 | Melin |
| 5,865,564 A | 2/1999 | Miller et al. |
| 5,971,661 A | 10/1999 | Johnson et al. |

FOREIGN PATENT DOCUMENTS

| EP | 496 519 B1 | 7/1992 |
| FR | 1375854 | 9/1964 |
| JP | 57174513 | 10/1982 |
| JP | 9119124 A | 5/1997 |
| NL | 1000539 C6 | 12/1996 |
| WO | WO 96/27710 | 9/1996 |

OTHER PUBLICATIONS

Disclosure for Potential Investors.

* cited by examiner

Primary Examiner—Heather Shackelford
Assistant Examiner—John Kreck
(74) Attorney, Agent, or Firm—Leydig, Voit & Mayer

(57) ABSTRACT

A liquid filled dike is described. The dike is formed of a flexible material selected to contain water. The dike includes at least two bladders which extend at least a portion of the length of the dike. The dike can be transported in empty condition and filled on site. When it is no longer required at a particular site, the dike can be emptied and stored for later use. The dike is self-leveling and may include a leak detection system.

33 Claims, 16 Drawing Sheets

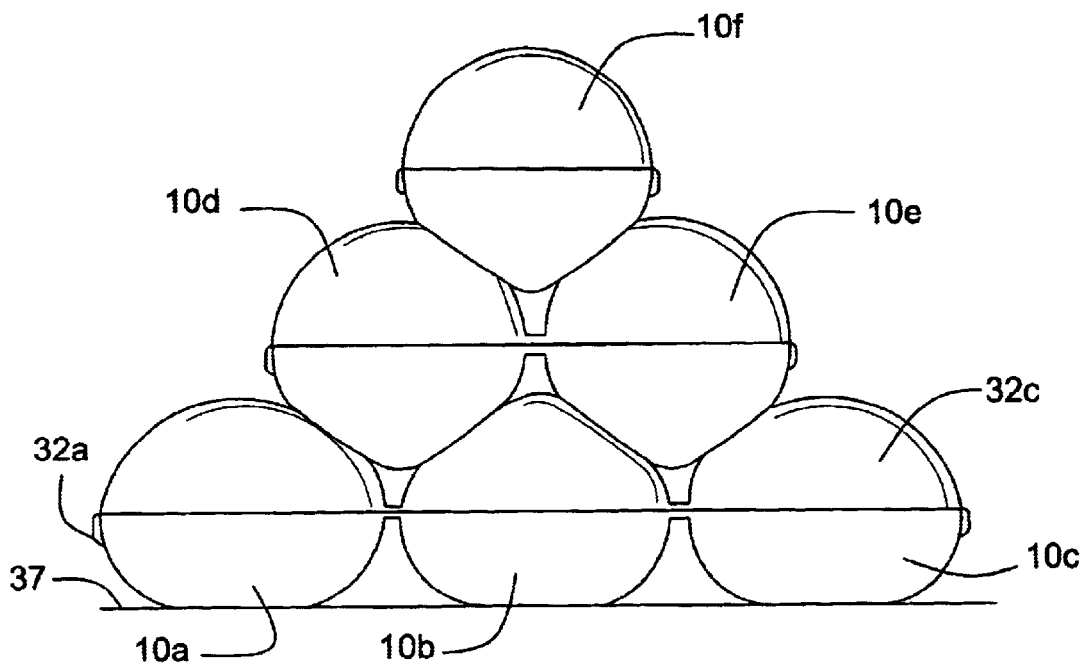
FIG. 3
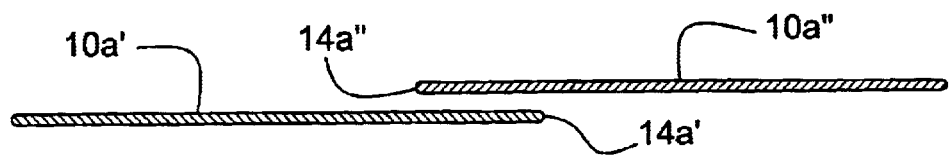
FIG. 4B-a
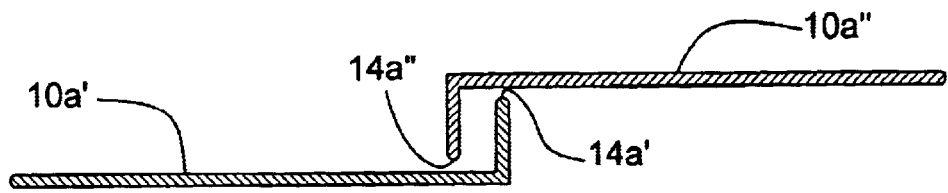
FIG. 4B-b
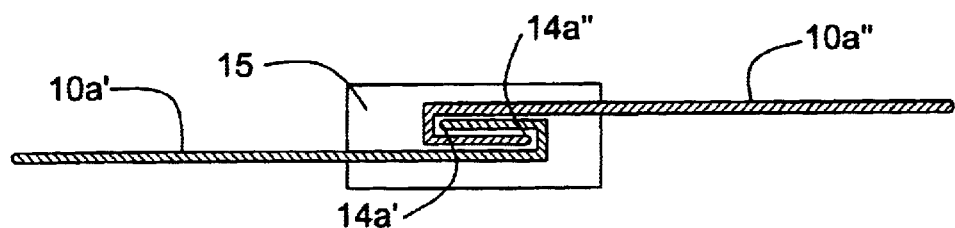
FIG. 4B-c

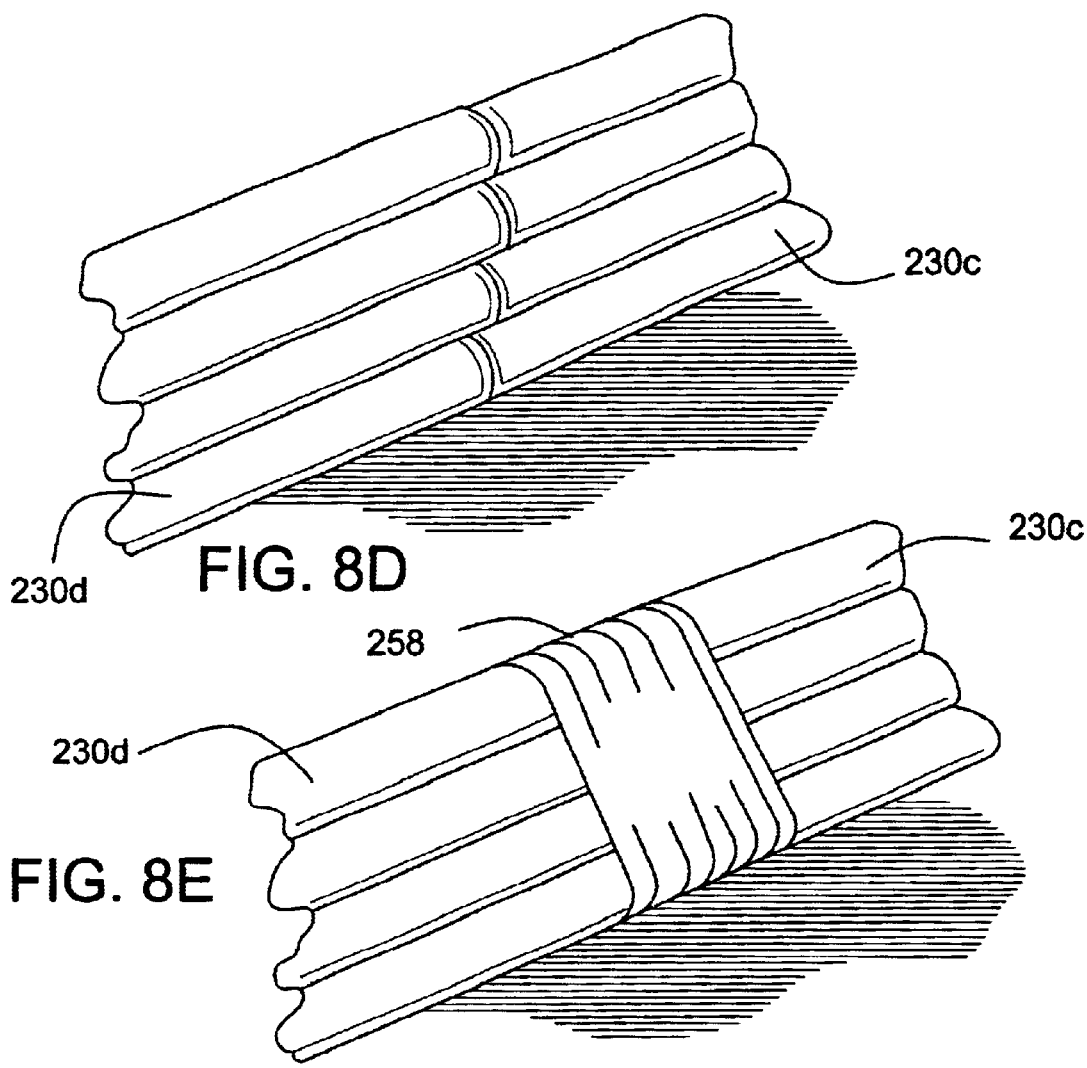
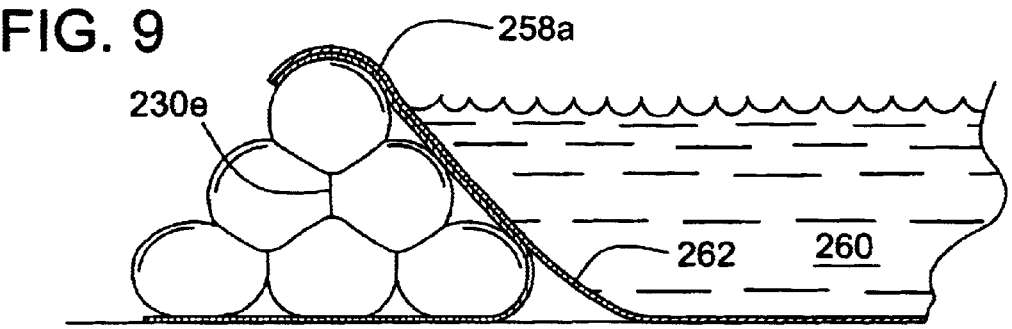

LIQUID CONTAINMENT/DIVERSION DIKE

This is a continuation-in-part of patent application Ser. No. 09/622,013, filed on Aug. 11, 2000, International Application PCT/CA99/00121, filed on Feb. 13, 1998, and which designates the U.S.

FIELD OF THE INVENTION

This invention is directed to a liquid containment/diversion dike and, in particular a liquid-fillable containment/diversion dike for flood control or liquid containment, bladder elements for use in the dike and a method for construction of a liquid containment/diversion dike.

BACKGROUND OF THE INVENTION

Many systems have been employed for controlling the spread of flood waters or fluid spills. One of the most common means for containing or diverting a flow of liquid is sandbagging wherein bags are filled with sand and piled to form a dike. Sandbagging to divert liquid flow has certain disadvantages including the cost of producing the sandbags and the difficulty in removing the barrier of sand bags when it is no longer required. SUMMARY OF THE INVENTION A liquid-fillable liquid containment/diversion dike has been invented which can be used to contain or divert a flow of liquid such as a flood or a liquid chemical spill. The dike is easily transported and is tillable on site. When the dike is no longer required, it can be emptied of the liquid it contains and then transported to the next site where it is required. The dike is resistant to failure due to puncture because of a multiple bladder arrangement.

Thus, in accordance with a broad aspect of the present invention, there is provided a dike section having a length and comprising a first elongate bladder formed of a flexible material to contain a liquid and a second elongate bladder formed of a flexible material to contain a liquid, the first elongate bladder and the second elongate bladder extending in side-by-side relation at least along a length of the dike, at least one wall dividing the first elongate bladder from the second elongate bladder, the wall formed to prevent any flow of liquid between the first elongate bladder and the second elongate bladder.

The dike section can have further bladders extending along the length thereof provided that at each cross-section along the long axis of the dike section there are at least two bladders extending in side-by-side relation. The dike section includes at least one wall between at least two bladders, the wall being selected such that no fluid flow is permitted between the bladders. However, where the dike section includes more than two bladders extending in side-by-side relation, some of the walls between the bladders can have formed therein perforations to permit water flow therethrough in order to facilitate filling of the dike section with liquid.

Preferably, at least some of the bladders in a dike section are secured together. The bladders can be secured together in any suitable way. In one embodiment, the walls of some of the bladders are formed integrally with each other. In another embodiment, the bladders are formed separately and are connected by any suitable means such as, for example, heat welds or fasteners such as rivets, belts or rope extending between the bladders or between apertures formed on the bladders.

The bladders are formed of any material which is flexible and which can contain water (i.e., watertight). As an example, the bladders can be formed of woven polyester or nylon fabric coated on one or both sides with urethane or vinyl. Preferably, the bladders are formed of 17 to 50 ounce woven polyester coated with vinyl on both sides. Any seams are sealed as by heat welding, adhesives or sewing to effect a liquid-tight seal.

Sealable ports are provided in each separate bladder to provide for access to the interior of the bladder for filling. Preferably, a one-way valve is provided at each port for connection to an injection nozzle. In a preferred embodiment, a header device is provided having a plurality of connectors for simultaneous connection to a plurality of bladder valves. Such a header device provides that more than one bladder can be filled simultaneously. Preferably, all valves are positioned on the side wall of the bladder or on the end wall of the bladder proximal to a side of the bladder to facilitate filling of the bladder without collapse. To prevent overfilling, preferably a check valve is provided in a wall of the bladder. In one embodiment, a pressure transducer is positioned in communication with the interior of at least some of the bladders of the dike section so that an alarm will sound if the pressure in a bladder falls below a predetermined level.

To form a dike, one or more dike sections are positioned on the ground in substantially the final selected site of the dike and the bladders are filled with a liquid, for example, water from a potable water supply or surface water. A seal is effected between the dike section and the ground by the weight of liquid forcing the walls of the bladders into close contact with the ground and each other to prevent a passage of liquid therepast. Where more than one section is required to form a dike, the dike sections are positioned in end-to-end contact such that they seal against one another. The dike sections can be formed with ends of any shape provided they are formed to fit together with other dike sections to form a seal therebetween. Thus, the dike sections can be blunt, slanted or irregular at their ends. In one embodiment, the individual bladders of the dike sections are formed to be connected to the bladders of the abutting dike section.

In one embodiment, the dike section includes a pyramidal configuration of elongate bladders. As an example, there is a base layer of bladders positioned to extend in side-by-side relation. On this base layer are positioned a second layer of bladders. The number of bladders in the second layer is less than the number of bladders in the base layer. If possible, a third and further layers of bladders are positioned on the second layer. The walls of the bladders can be formed fully or partially integral with each other. In one embodiment, the dike section is formed from a plurality of elongate dike bladders which are fully or partially separable.

It has been found that the operation of the dike section can be enhanced by preventing the water from seeping between the bladders. Thus, in one embodiment, a sheet of material can be partially or fully wrapped about the dike section at the intersection of abutting dike sections or along the length of a dike section. In addition, or alternately, a sheet of material is positioned over the containment side of the dike section to extend a selected distance over the ground surface away from the dike section. The sheet of material is preferably liquid-tight.

In accordance with another broad aspect of the present invention, there is provided an elongate dike bladder comprising: a tube closed at its ends and having a wall and a long axis between the ends, the tube formed to be flexible and watertight, and at least one port for access to the interior of the bladder.

In one embodiment, each elongate dike bladder is formed as a tube of flexible, watertight material with a membrane extending across the interior of the tube parallel to the long axis thereof. Preferably, the membrane extends substantially across the diameter of the tube. The membrane can be solid or perforated. A bladder is primarily intended to be used in combination with other bladders for liquid containment or diversion. However, a bladder can be used alone for containment or diversion of a flow of liquid depending on the size of the flow of liquid and the size of the bladder. In such a situation, however, the bladder to be used should be one in which the membrane is solid and does not permit fluid flow through the membrane so that a puncture along the bladder will not result in a complete loss of water pressure in the bladder.

According to another feature of the present invention, the bladder is formed as tube and the open ends are heat sealed or welded. To provide additional strength and integrity to the bladder ends, at least one of the ends is folded back on the bladder and maintained in this configuration by an end reinforcing sleeve. Thus, the ends do not independently withstand the pressure of the liquid within the bladder but instead are reinforced beneath the sleeve. Such a bladder is producible at low costs since a tube of watertight material can be used and cut into any suitable length and heat sealed or welded. Low cost welding procedures have been found to be particularly appropriate and cost efficient to close off the ends of the tubes.

BRIEF DESCRIPTION OF THE DRAWINGS

A further, detailed description of the invention, briefly described above, will follow by reference to the following drawings of specific embodiments of the invention. These drawings depict only typical embodiments of the invention and are therefore not to be considered limiting of its scope. In the drawings:

FIG. 3 is an end elevational view of the unbroken-away dike section of FIG. 2A;

FIGS. 4B-*a* to 4B-*c* are schematic representations of a process for securing two bladders in end-to-end configuration;

FIGS. 8A–8E are a schematic view of a dike construction operation according to teachings of the present invention;

FIG. 9 is a sectional view through another dike section according to teachings of the present invention;

DETAILED DESCRIPTION OF THE PREFERRED EMBODIMENT

Figure 1A:
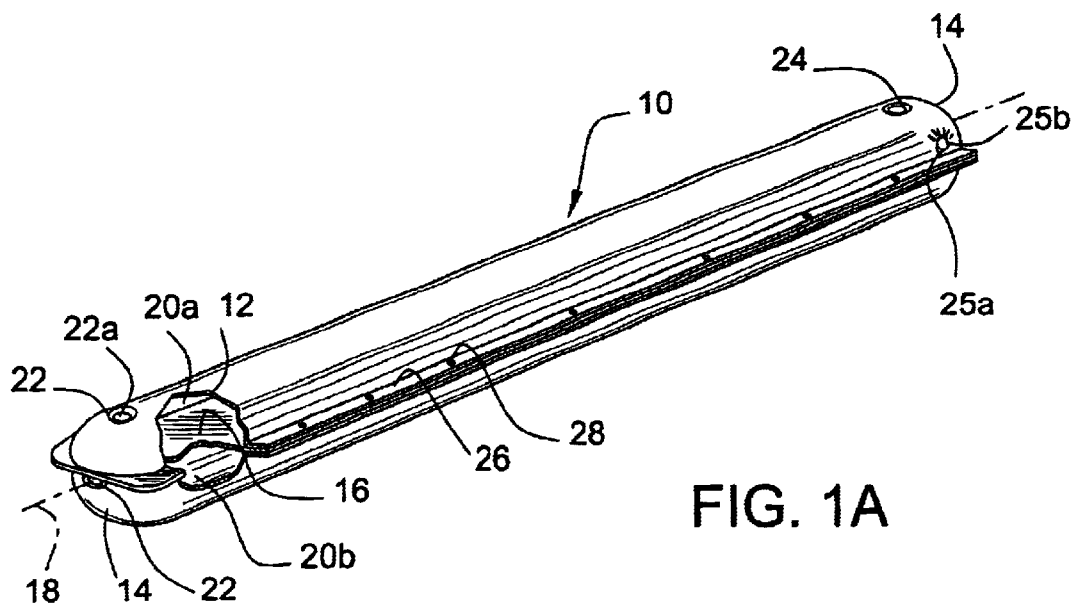
FIG. 1A is a perspective view of a dike bladder according to teachings of the present invention, the end of the dike bladder being cut away to show the internal structure.

Referring to FIG. 1*a*, a dike bladder 10 according to one aspect of the present invention is shown. Dike bladder 10 includes a wall 12 formed generally as a tube and closed at its ends 14. A membrane 16 extends substantially diametrically across the interior of the bladder along its long axis, indicated as 18. Membrane 16 acts to strengthen the form of the bladder and to distribute outward forces acting on the bladder, when filled with liquid, to reduce the chance of bladder damage due to seam bursts. Membrane 16 can be solid, as shown, to prevent passage of liquid between chambers 20*a*, 20*b* separated by membrane 16. When solid, membrane 16 acts to isolate chamber 20*a* from chamber 20*b* to thereby prevent full collapse of the bladder should a leak occur in one of the chambers. Alternately, to facilitate filling of the bladder, membrane 16 can be perforated (FIG. 2A) to permit liquid flow between chambers 20*a*, 20*b*.

Ports 22 having removable plugs 22*a* therein are disposed in the bladder wall for liquid injection into the chambers. Since, in the illustrated embodiment, no fluid flow can occur between chambers 20*a*, 20*b*, a port must be provided for each chamber. However, if membrane 16 is perforated, one port can be used to fill the entire bladder.

Figure 1B:
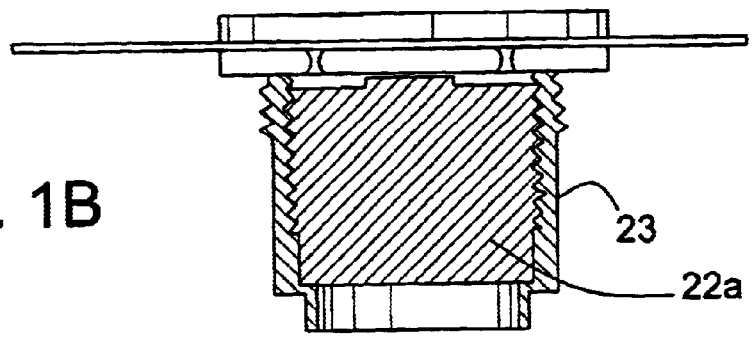
FIG. 1B is a sectional view through a bladder plug useful in the present invention.

Referring to FIG. 1B, a useful port/plug assembly is shown. Ports 22 preferably include a threaded insert 23 which is sealably secured into the material of wall 12 by use of a retaining nut 23*a*. Plug 22*a* is threadably insertable into insert 23. A suitable port and plug arrangement is, for example, an ABS flush drain valve secured into the wall of the bladder. Alternately, ports can have disposed therein one-way valves which can be fully opened to permit emptying of the bladder, when desired. Preferably, as shown, the ports are positioned proximate one side of the bladder to reduce collapse of the bladder during filling.

A pressure release valve 24 is also provided for each separate chamber of the bladder to prevent damage resulting from overfilling. A pressure detector 25*a* and a signal 25*b* is disposed in wall 12 of bladder 10 to monitor the pressure of the liquid in the bladder and to emit a signal when a pressure below a preselected pressure is detected. The signal can be, for example, an audible alarm or a radio signal etc. to a monitoring panel. The pressure release valve and the pressure detector and signal can be mounted on the bladder in combination as one unit. Other valves and pressure detection and signalling means can be used, as desired.

Bladder 10 including the walls and the ends and, if desired, the membrane can be formed of any suitable flexible, watertight material. In a preferred embodiment, bladder 10 is formed of nylon- or urethane-coated polyester. Preferably, the material should be selected to have limited stretch. A particularly useful material is available as Hurculite™. Any seams of the bladder can be prepared to provide a watertight seal by folding, heat welding, adhesives and/or sewing. In the embodiment, as shown, the material is laid out in three layers and overlapping edges are folded and heat welded to effect a watertight seal. The folded portion forms a flange 26 which extends out from the bladder. Preferably, flange 26 includes reinforced apertures 28 formed therethrough for receiving fasteners for connection of adjacent bladders during dike construction. The use of fasteners with sharp edges should be avoided, however, to prevent puncturing. Preferably, ends 14 are formed without flanges to provide for close contact with any abutting bladders.

Figure 1C:
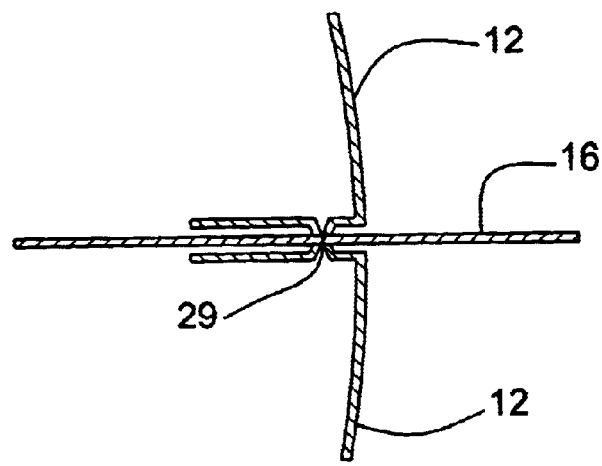
FIG. 1C is a sectional view through a bladder side seam useful in the present invention.

Other methods of bladder construction can be used, as desired. Referring to FIG. 1C, another method of forming the bladder is shown wherein the walls 12 of the bladder are folded inwardly over membrane 16 and welded, as indicated at 29, in place.

Figure 1D:
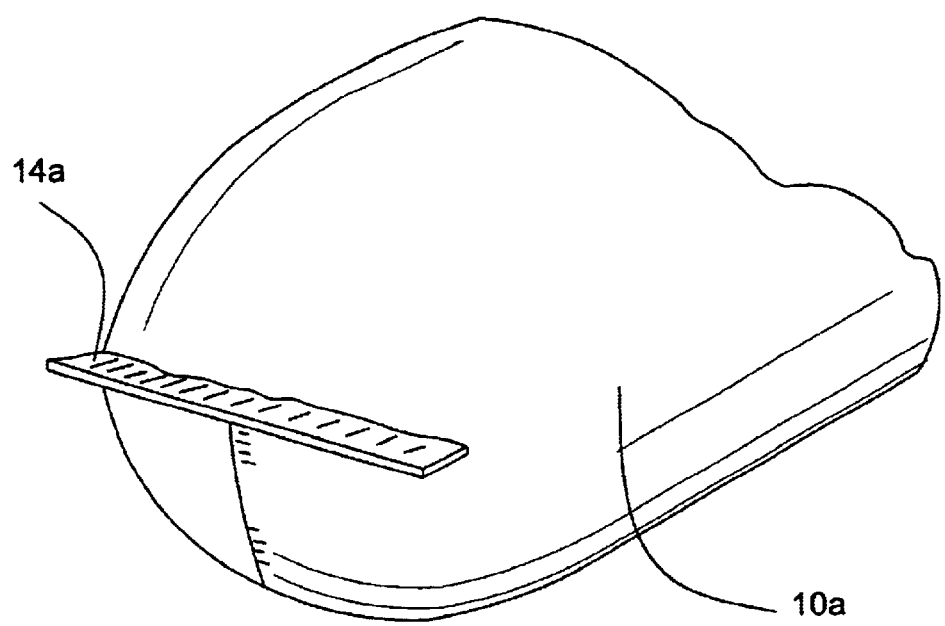
FIG. 1D is a perspective view of an end of a dike bladder according to teachings of the present invention.
Figure 1E:
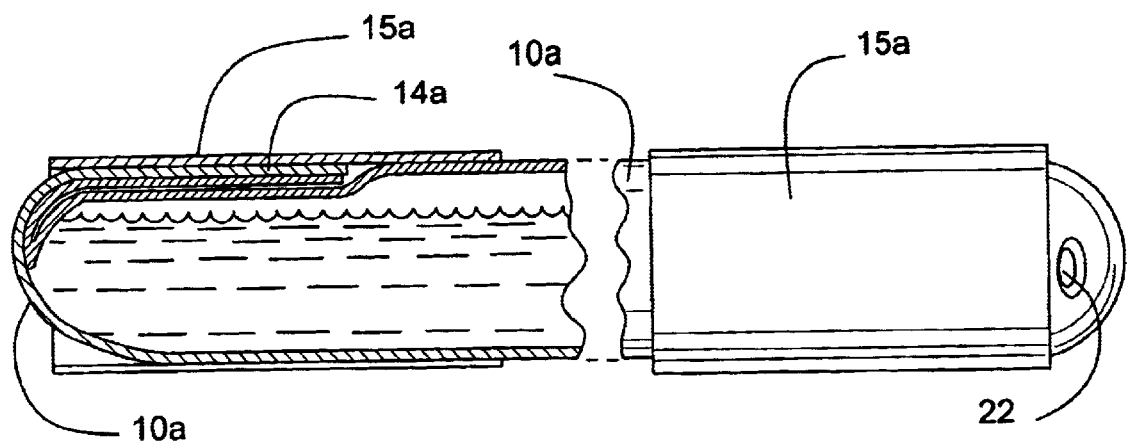
FIG. 1E is a side elevation view of another bladder according to teachings of the present invention shown partly in section.

Referring to FIGS. 1D and 1E, a cost-effective and easy to produce bladder 10a is shown. Bladder 10a includes walls 12a formed of a tube of watertight material, such as Hurculite™, which has been rolled and heat welded to form a tube. The ends 14a of the bladder are closed by heat welding. Such a construction permits any length of bladder to be formed quickly and easily without the requirement for a complicated construction to close the ends. As would be appreciated, the pressure on ends 14a is great when bladder 10a is filled with water, thus, bladder 10a further includes end reinforcing sleeves 15a for use in reinforcing the end to permit filling of the bladder without bursting the end seam. End reinforcing sleeves 15a are sized to maintain ends 14a in a condition folded back over the bladder. In a preferred embodiment, a length of bladder tube material is used for the end reinforcing sleeves. By using the tube material for both the bladder and the sleeve, the cost and ease of manufacture of the bladder are both enhanced. A sleeve having a length of 3 to 4 feet has been found suitable for use in reinforcing the ends of a 24" bladder. Preferably, the end of the bladder is folded back and the sleeve is placed around the end of the bladder and over the folded end when the bladder is in an empty or partially filled state. As the bladder fills, it expands within the sleeve and the end is maintained firmly between the sleeve and the bladder. Sleeves 15a maintain ends 14a in a folded configuration and permits the bladder to be filled with liquid without concern about bursting the end seams. A preferred fill port 22 for such a bladder is a Munsen™ valve.

Bladders of any diameter and length can be formed. To facilitate transport and use, bladders of 10", 17" or 24" diameter and 50 foot lengths are preferred.

Figure 2B:
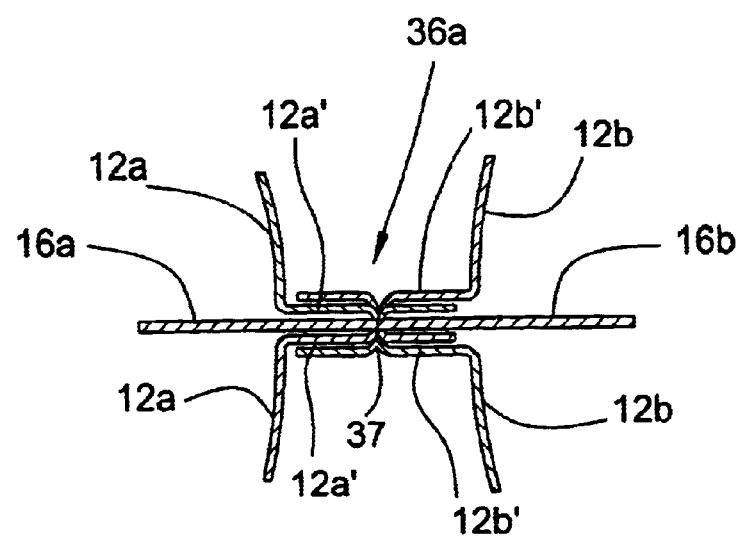
FIG. 2B is a sectional view through a bladder seam useful in the present invention.
Figure 2A:
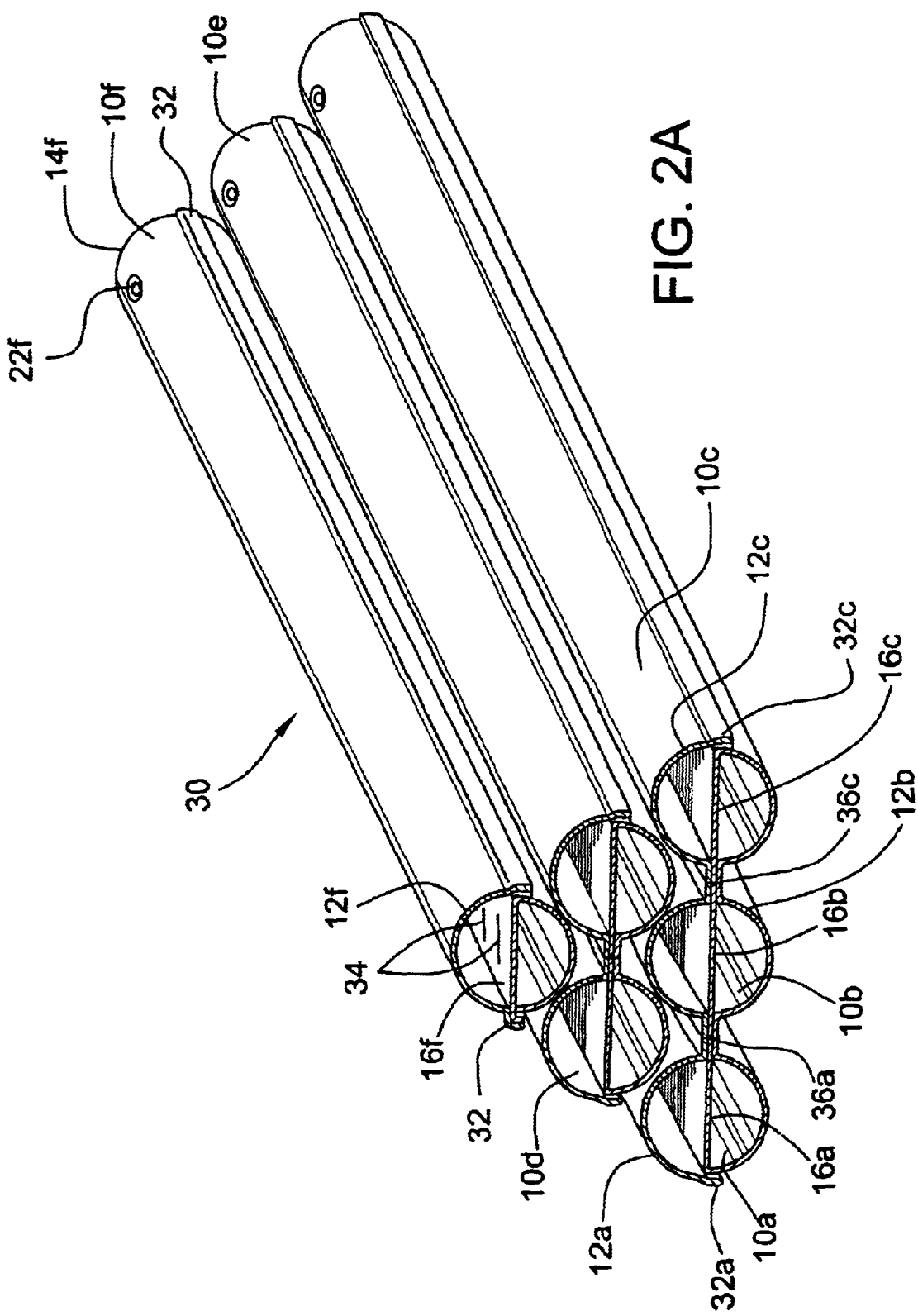
FIG. 2A is a perspective view of dike section according to teachings of the present invention, the end of the dike section being cut away to show the internal structure.

The bladders of the present invention can be filled with a liquid through their ports and use alone to divert or contain a flow of liquid. For containment or diversion of more significant flows, it has been found that it is advantageous to use bladders, generally as shown in FIGS. 1A to 1E, to form a dike section 30 as shown in FIGS. 2A and 3. Dike section 30 is shown generally schematically in FIG. 2A as it would not appear in this form either when filled with liquid for use or when empty for transport. The same dike section is shown in FIG. 3 with exemplary distortion of bladder shape by the effect of compression from the weight of the water within the bladders. Dike section 30 includes six bladders 10a to 10f, generally as described in FIG. 1. The bladders are arranged in three layers to form a pyramidal configuration. In particular, bladders 10a, 10b and 10c form a base layer, bladders 10d and 10e form a second layer, and bladder 10f forms a third layer. Using bladder 10f as an example, each bladder includes a side wall 12f, a membrane 16f and ends 14f (only one can be seen as the other was removed from the drawing to permit illustration of the interior form). Bladder 10f is formed having seams 32 sealed by rolling and welding. Seams 32 are substantially flush with the outer surface of the bladder. This enhances sealing contact with an optional dike wrap, as will be described and shown hereinafter.

Membrane 16f has formed therein perforations 34 to permit liquid flow therethrough. Preferably, perforations 34 are formed to extend along the width of the membrane, as shown, so that they extend parallel to the main stress vectors of the membrane to thereby not compromise the strength of the membrane. A single valve 22f is provided at an end of bladder 10f.

To permit construction in this pyramidal configuration, the base layer of bladders 10a to 10c must be secured together to prevent the outside bladders 10a and 10c from being forced out of position. Bladders 10a to 10c can be secured together in side-by-side relation in any suitable way, such as, for example, by fasteners secured between flanges 26 or preferably by heat welding the bladders together or forming them integrally. Bladders 10a to 10c can be formed such that membranes 16a, 16b, and 16c are formed of a single sheet of material which extends from seam 32a to seam 32c. Sides 12a, 12b and 12c are applied on either side of the sheet of material forming membranes 16a to 16c and seams 32a, 32c and 36a, 36c are formed to seal the bladders from liquid communication with each other. Referring to FIG. 2B, one method for formation of, for example, seam 36a is shown. To form seam 36a, sides 12a and 12b are applied on either side of the single sheet of material intended to form membrane 16a, 16b. The ends 12a' of walls 12a and the ends 12b' of walls 12b are overlapped and sealed, as by heat welding indicated at 37, against membrane 16a, 16b.

Bladders 10d and 10e are also connected to permit them from being forced out of position by the weight of bladder 10f. However, it is to be understood that bladders 10d and 10e need not be connected in this way as the forces imparted by bladder 10f may not be significant when compared to the amount of force required to move bladders 10d and 10e out of the indents formed between bladders 10a and 10b and bladders 10b and 10c, respectively.

To construct a dike section as shown in FIGS. 2A and 3, bladders 10a to 10c are positioned on a ground surface 37. Bladders 10a to 10c can be separate and connected together with fasteners or other means or can be formed as a single unit, as shown. The bladders will be in collapsed condition to ease transport and placement. After the bladders are in position on ground surface 37, water is injected into the bladders through their valves. Once bladders 10a to 10c are filled to a suitable pressure with water, bladders 10d and 10e, in collapsed condition, are positioned in the indents formed between the bladders of the base layer. Bladders 10d and 10e are then filled with water to a selected fullness or pressure. The bladder 10f is then placed in the indent between bladders 10d and 10e and it is filled with water. The dike section is then ready for use to divert and/or contain a flow of liquid. In a preferred embodiment for use in flood control, a dike section of about 7' width by 5' height can be formed using six bladders of 24 inch diameter. Where a dike of greater height or strength is required, further bladders can be added against the dike and secured to the other bladders of the dike or larger bladders can be used. It has been found that the dike will act in an enhanced way to control a flow of liquid where all of the bladders in a dike section are secured together.

Figure 4A:
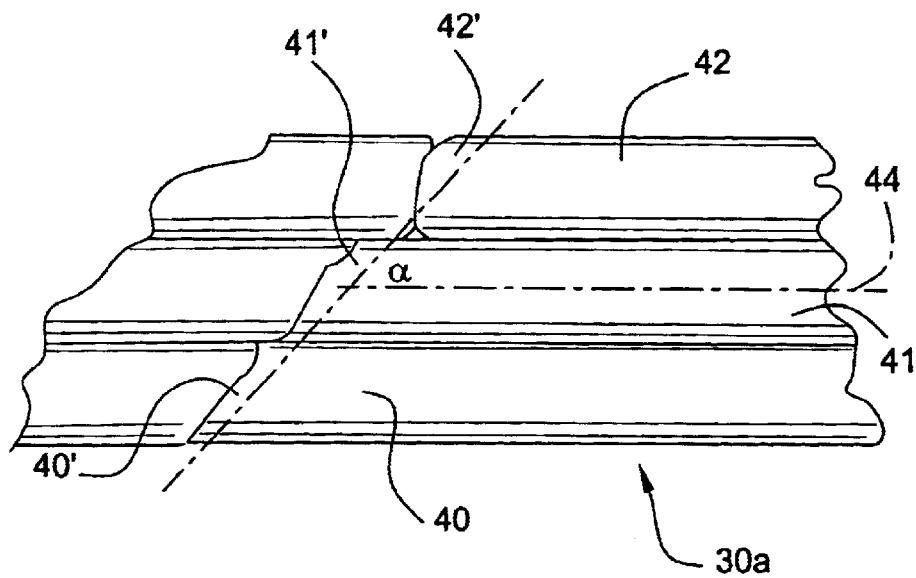
FIG. 4A is a side elevation view of two dike sections positioned in end-to-end configuration.

The ends of dike section 30 can be formed in any suitable way to permit end-to-end abutment to create a watertight seal between the dike sections. One embodiment of a dike section 30a having an end which is slanted is shown in FIG. 4A. In particular, dike section 30a is formed from a plurality of bladders including a base layer 40 of three bladders (only one of which can be seen), a second layer of two bladders 41 (only one of which can be seen), and a third separate bladder 42. The dike section is formed such that the end 42' of bladder 42 is recessed from the ends 41 ' of bladders 41 and, similarly, the ends 41' of bladders 41 are recessed from the ends 40' of bladders 40. This causes the end of dike 30a to be slanted, in side view, a particular angle α from the long axis 44 of the dike section 30a. The angle a will depend on the degree to which the bladders are recessed from each other. The end of dike can be sealed against another dike 30b having a similarly slanted end. It would also be understood that dike section 30a having a slanted end can be rolled onto its side and used to form bends in a dike. The ends of the dike sections can have other forms, as desired.

Referring to FIGS. 4B-a to 4B-c, the ends of dike sections can be secured together in a convenient way when bladders as shown in FIGS. 1D and 1E are used. In particular, the ends 14a', 14" of abutting bladders 10a' and 10a" can be rolled together and secured in this rolled configuration using an end reinforcement sleeve 15a. FIG. 4B-a shows the first step in which abutting bladders 10a', 10a" are set in position for use with their ends 14a', 14a" in overlapping configuration. Ends 14a', 14a" are then rolled together (FIGS. 4B-b and 4B-c) and sleeve 15 is placed over the rolled ends. As may be seen in FIGS. 4B-a through 4B-c, the term "rolled" is intended to include an arrangement wherein the ends of the dike sections are folded over each other and engaged as few times as a single turn. The water is then provided to fill the bladders so that they expand within the sleeve and are maintained in the rolled configuration by the sleeve 15.

Figure 5:
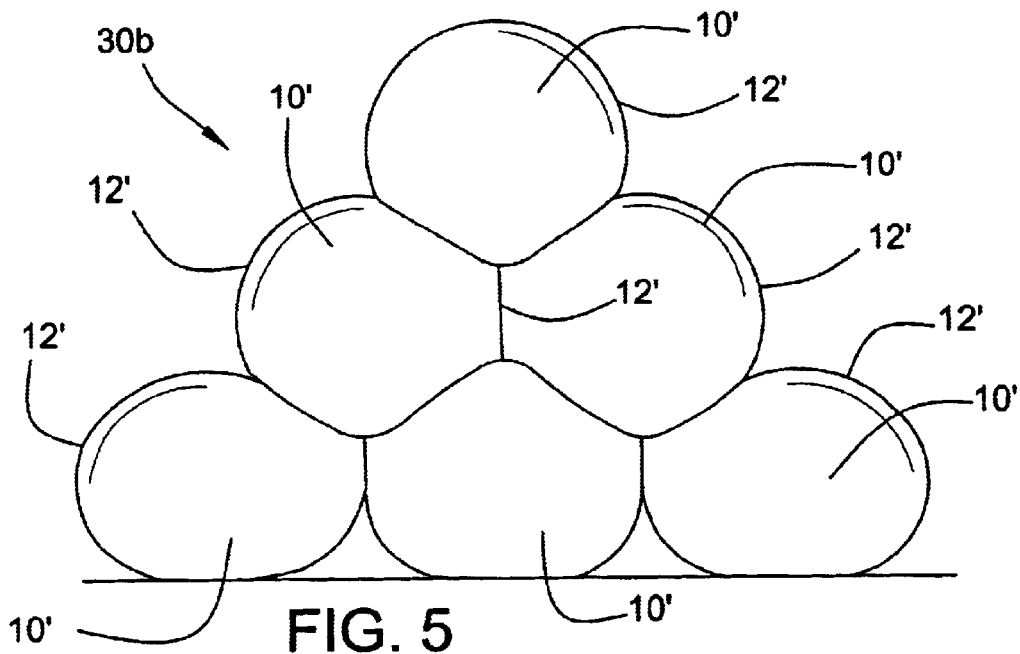
FIG. 5 is an end elevational view of a dike section according to teachings of the present invention.

Referring to FIG. 5, a sectional view through another dike section 30b is shown including a plurality of bladders and wherein the walls between the bladders are formed integral. The six bladders 10' are not separable each from the other. The walls 12' of the bladders are solid such that no fluid communication is possible between the bladders. This prevents total failure of the dike section where a puncture occurs in one of the bladders. Dikes containing other numbers of bladders can be made. A dike, as illustrated in FIG. 5, can be made by any suitable means, such as, for example, by extrusion or pultrusion.

Figure 6:
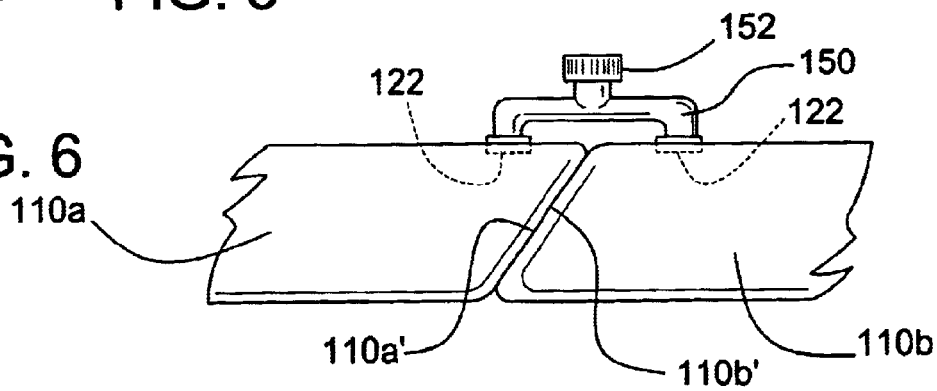
FIG. 6 is a side elevation view of two dike bladders in end-to-end configuration during a liquid filling operation.

To facilitate the filling operation of a dike section, preferably a header system is used. FIG. 6 shows one header arrangement wherein bladders 110a, 110b are formed with ends 110a' and 110b' intended to be abutted together to effect a seal therebetween. Valves 122 are positioned adjacent ends 110a' and 110b' and in communication with the interior of the bladders. A header connector 150 is provided for removable attachment to the valves 122. Preferably header connector 150 is formed of flexible hose to permit some adjustment depending on the spacing of valves 122. Header connector 150 has positioned thereon a valve 152 for connection, for example, to a fire hose (not shown). During a dike construction operation, bladders 110a, 110b can be positioned so that their ends 110a' and 110b' carrying the valves 122 are in end-to-end configuration. Header connector 150 can be attached to valves 122 and a hose (not shown) can be connected at valve 152. Water from a water source can be supplied through the hose and into the header to be distributed to bladders 110a, 110b.

Figure 7:
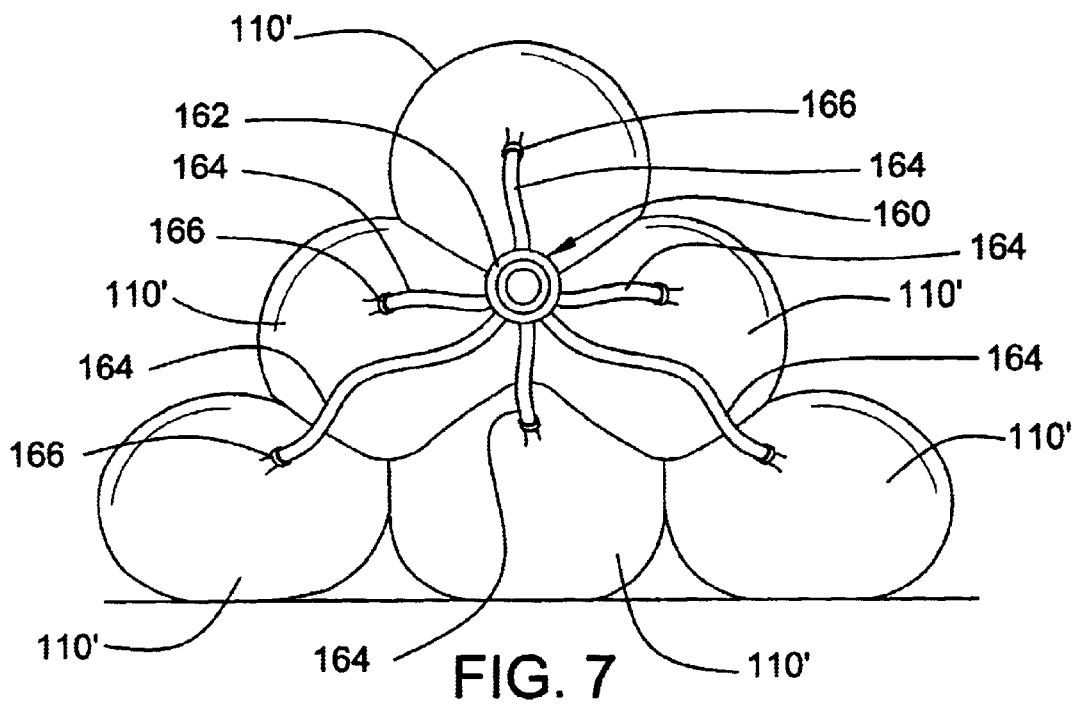
FIG. 7 is an end view of another embodiment of a dike section according to teachings of the present invention.

Referring to FIG. 7, more complex header 160 can be provided to permit simultaneous filling of a plurality of bladders. Header 160 includes a main valve 162 for connection to, for example, a fire hose nozzle. A plurality of flexible tubes 164 extend between valve 162 and bladders 110' of a dike section. Positioned in each tube 164 is a one-way valve 166 which permits liquid to pass therethrough into the bladder but prevents liquid from passing from the bladder back towards valve 162. Thus, water can be injected simultaneously into all of the bladders connected to valve 162, but water cannot be drained out of the entire dike section by a puncture in one of the bladders.

Referring to FIGS. 8A to 8E, the construction of a dike according to the present invention is shown. A bladder unit 209 containing four bladders 210a is rolled out in a selected position on a ground surface 37. Bladders 210a are connected by seams 236a so that they cannot move apart, but seams 236a prevent liquid communication between the bladders. Each bladder includes a one-way valve 222 for injection of water into the bladder. A header connector 250 is connected to a water house 256 which is in communication with a water source 7. Header connector 250 is connected to valves 222 and water is passed from the source to the bladders to fill the bladders to a selected level. The header connector is then removed from valves 222. The point at which the bladders are properly filled can be determined by timing, observation of the nature of the bladders, pressure release valves (see 24 of FIG. 1) or using other means. Other methods can be used for filling the bladders, but use of a header facilitates the filling operation.

Once bladders 210a are filled to a suitable pressure with water (FIG. 8B), a unit 211 including three bladders 210b, in collapsed condition, is positioned on top of unit 209. Bladders 210b are then filled with water in a similar manner as that described hereinbefore. During the filling operation, bladders 210b will, by gravity, drop into the indents between bladders 210a.

Figure 8A:
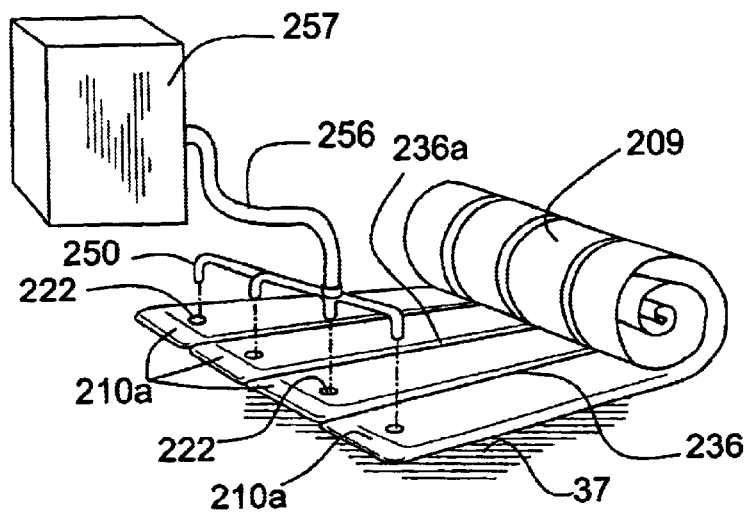
Figure 8B:
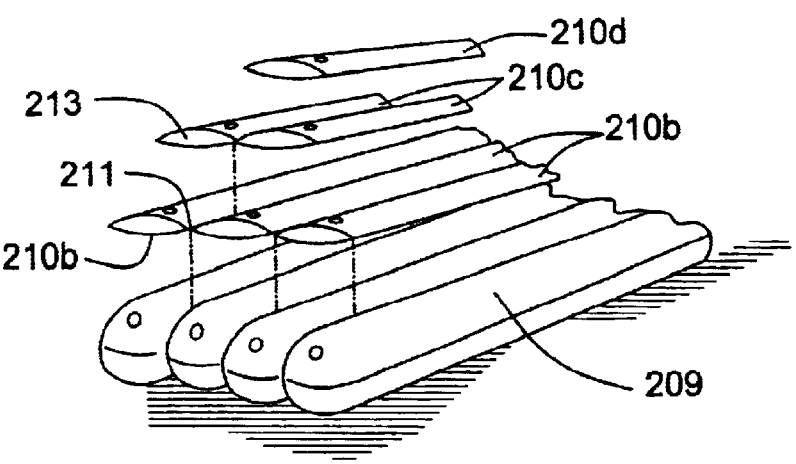
Figure 8C:
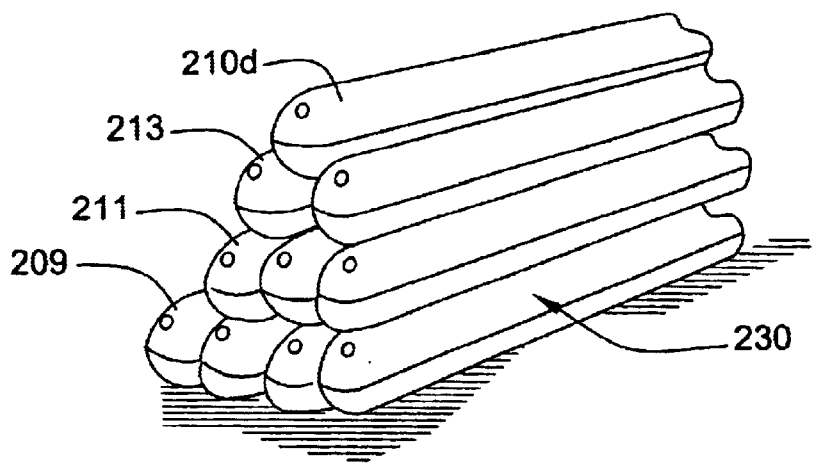

A further unit 213 containing two bladders 210c is positioned onto unit 211 and filled. Finally a top bladder 210d is placed on top of the other units and is filled with water. The construction of dike section 230c is then complete (FIG. 8C). Preferably, each bladder is connected to at least one other bladder to increase the strength of the dike section.

A second dike section 230d is constructed to be in abutting relation to dike section 230c (FIG. 8D) and other dike sections can be added to produce a dike of selected length.

Where the flow of liquid to be contained or diverted increases beyond the size of dike section 230c, further bladders can be positioned adjacent the dike section, filled and secured to the dike section.

To reinforce the end-to-end connection, a wrap 258 can be positioned around the end-to-end connection (FIG. 8E). Wrap 258 can be formed of plastic material or any other material of suitable strength and which will not break down when in contact with the liquid to be contained or diverted. The constructed dike is then ready to be used to divert and/or contain a flow of liquid.

Figure 10:
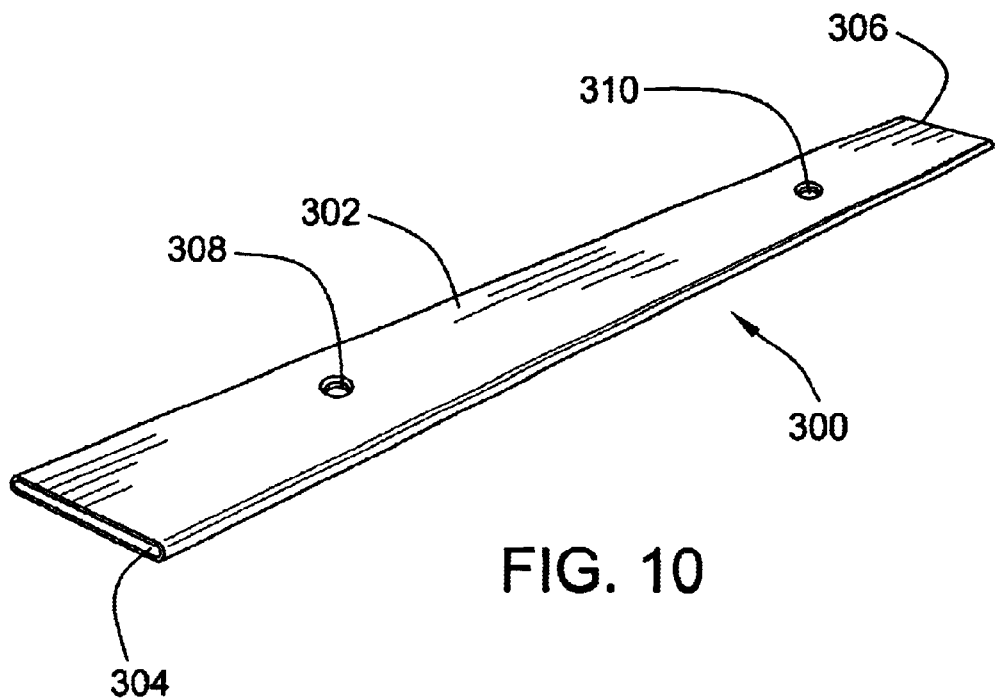
FIG. 10 is a perspective view of an uninflated tube according to teachings of the present invention.

In an alternate embodiment of the invention, the bladders are formed separately and connected by any suitable means. In the currently preferred embodiment, illustrated in FIGS. 10–11, individual bladders 300 are utilized which have an elongated tube 302 having ends 304, 306. In the currently preferred embodiment, when filled, the tube 302 takes on a generally circular configuration and is on the order of 58"–60" in circumference. In order to allow each bladder 300 to be filled, a port 308 is provided at one end of the bladder and a pressure relief valve 310 is provided at the opposite end. It will be noted that this embodiment of the bladder does not include an internal membrane (as illustrated, for example, in FIGS. 1A and 2A).

In assembling a dike section utilizing the elongated tube 302, the end 304 of the unfilled tube 302 is folded over 312 and disposed within a reinforcing sleeve 314 when disposed at the end of the dike section. As may be seen in FIG. 11, preferably the end 304 of the tube 302 is folded upward and over on the order of 24 inches or so. A sleeve 314 of a similar circumference and a length on the order of 48" is slipped over the folded over section 312, preferably two inches or so beyond the folded end 304. The opposite end of the sleeve 314 is then folded under the tube 304, 312.

When the tube 302 is included as a part of a longer dike section, the end 306 of the tube 302 is preferably folded over to engage the folded end 316 of a divergently disposed tube 318. A similar sleeve 320 is then disposed over the interlocked end sections 306, 316. It will be appreciated that the ends 304, 306, 316 are so folded and held in place by the sleeves 314, 320 quickly and effectively to allow the tubes 302, 318 to retain water under pressure.

In order to construct a section of a dike which is higher than the diameter of a single tube, a unique strapping arrangement may be utilized. To join two or three tubes together, a strap 330 of at least a sufficient length to encircle the tubes individually and sufficient strength to withstand the forces exerted by the tubes and on the tubes due to the fluids which the dike is designed to withstand. In the preferred embodiment, strap 330, designed for use with three 19-inch diameter tubes, is 2 inches wide and 17 feet long and has a minimum breaking strength on the order of 9800 pounds per inch. While any material of appropriate strength may be utilized, woven fabrics such as polyester mesh have been found to be most suitable.

Figure 13:
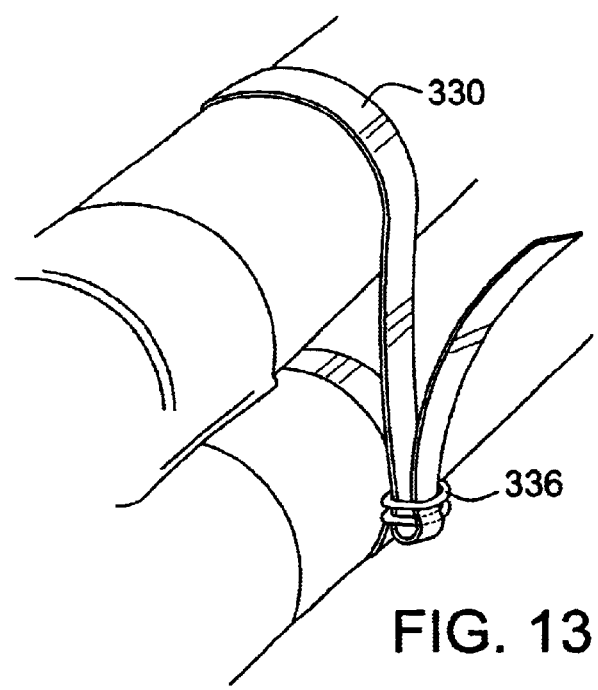
FIG. 13 is an enlarged view of a strap and buckle in use.

To facilitate connection and locking of the strap 330, a first buckle 332 is included at the proximal end 334 of the strap 330, and a second buckle 336 is spaced in from the proximal end 334 on the order of approximately the circumference of the tubes. In the illustrated embodiment, the buckles 332, 336 are in the form of two "D" buckles, such as are shown in FIG. 13, the second buckle 336 being spaced on the order of 54 inches from proximal end 334 disposed along on the side of the strap 330. The significance of the buckle 332, 336 placement will become clear upon an explanation of the method of placement of the strap 330 and coupling with the buckles 332, 336.

While the assembly operation will be described with reference to generally circular, cylindrical tubes, it will be appreciated that tubes of alternate cross-sectional shapes may likewise be utilized. It is to be further understood that although the figures provided and referenced with regard to the construction of the dike section show the tubes with their ends disposed substantially along a single vertical plane, it will be appreciated that the ends of the lengths of tubes may be staggered. The tubes so connected may also comprise a number of tubes with the ends connected as shown, for example, in FIG. 11. Accordingly, it is to be understood that the term "parallel" as used in the specification and claims does not require that the individual tubes be positioned with the ends disposed substantially adjacent one another, but, rather that the tube or axis is, in general, parallel to another axis or tube such that the ends may be offset.

Figure 11:
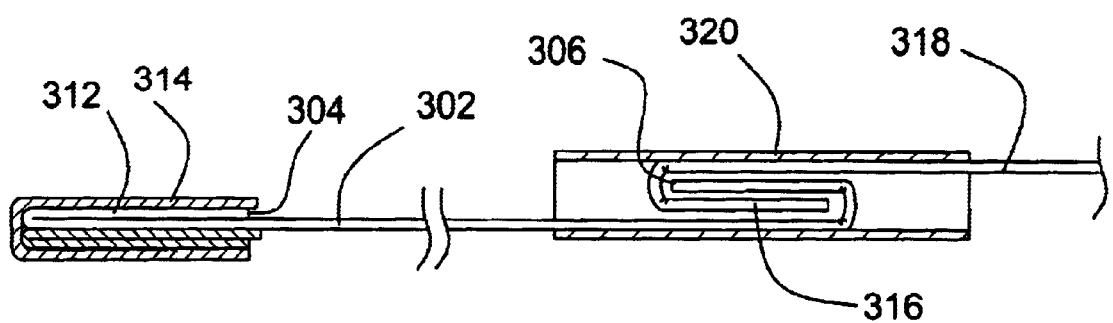
FIG. 11 is a side cross-sectional view of the end portions of an uninflated tube such as is shown in FIG. 10 with one end folded within a sleeve, as it would be in the end section of a dike, and the opposite end engaged with an adjacent tube and within a sleeve, as it would be in a central portion of a dike.
Figure 12A:
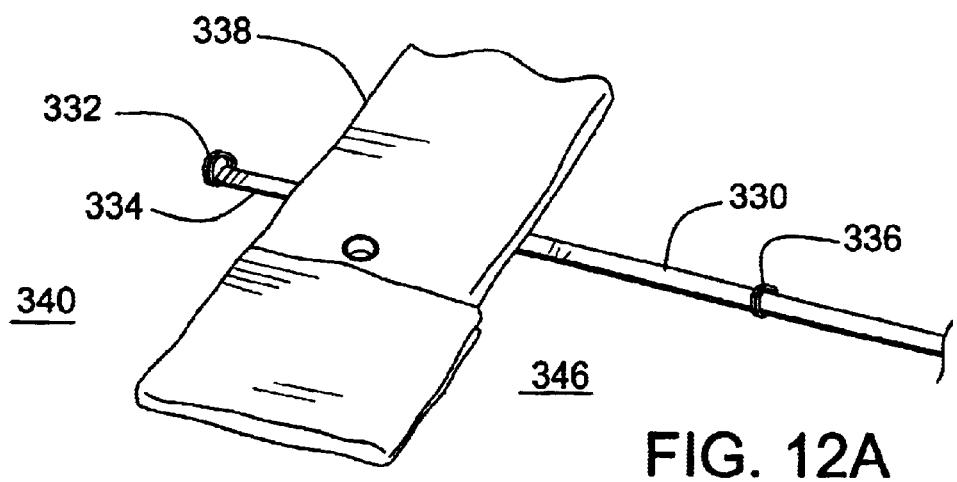
FIGS. 12A–L are fragmentary perspective views of the construction of a dike section.

Referring now to FIGS. 12A–M, in assembly, a first uninflated tube 338 with its ends closed or attached as shown in FIG. 11 is rolled out to the position where it will be utilized to arrest flood waters or the like. The strap 330 is then positioned beneath the tube 338 with the proximal end 334 (having the buckle 332) preferably toward the wet side (shown generally at 340), with the strap 330 extending perpendicular to the direction the tube 338 is disposed and extending 6 to 8 inches beyond the edge of the tube 338. The strap 330 is placed with the second buckle 336 accessible from the upwardly facing surface. As shown in FIG. 12A, the "D" buckles of the preferred embodiment are facing up. Like straps (not shown) are similarly positioned on the order of every six feet along the tube 338. While multiple straps are preferably utilized along the length of the tube 338 approximately every six feet, the following explanation will be made generally in reference to a single strap 330. It will be appreciated, however, that the same procedures are performed with regard to each strap positioned along the length of the dike. The tube 338 is then inflated with water.

Figure 12B:
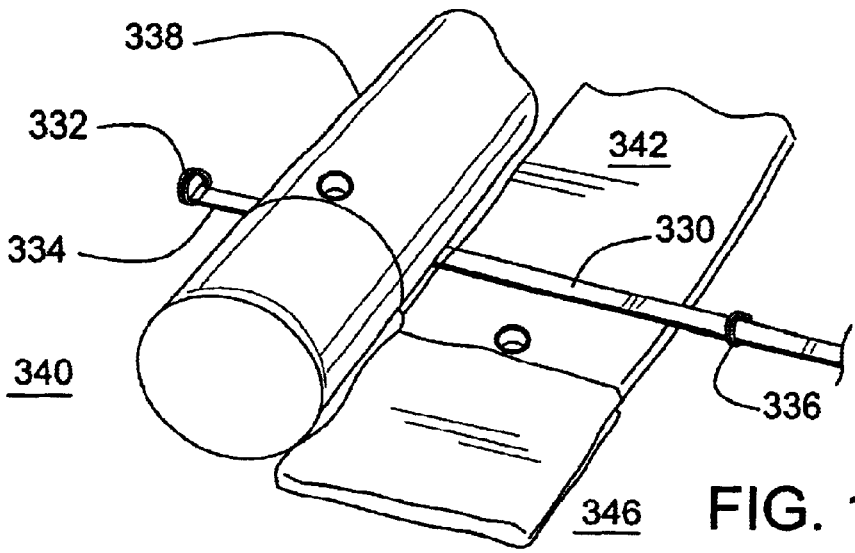
Figure 12C:
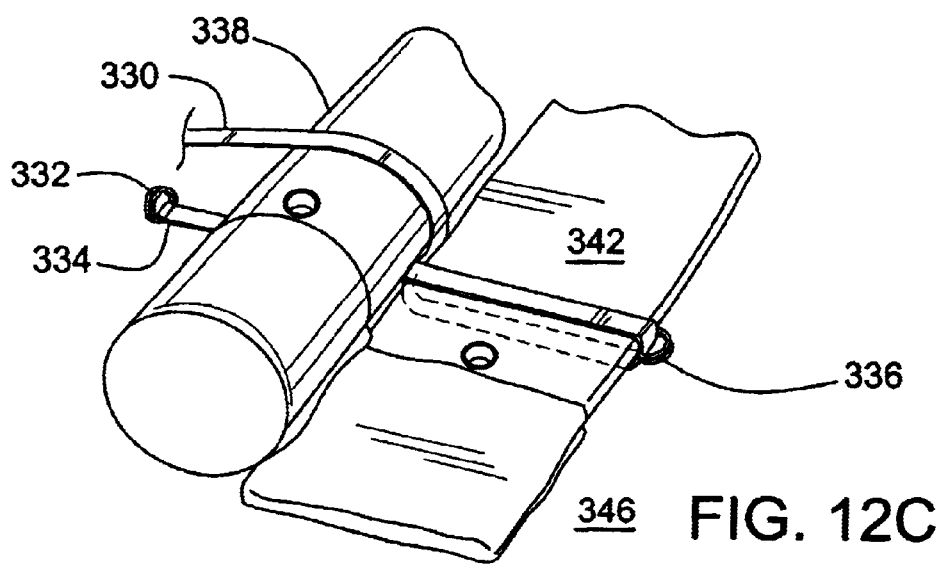
Figure 12D:
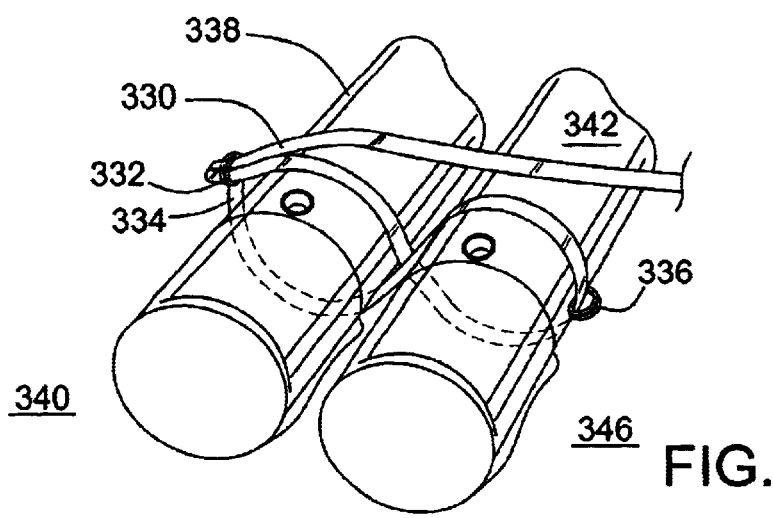

As may be seen in FIG. 12B, a second tube 342 is then rolled out parallel the first tube 338 and the strap 330 placed over the top of the second tube 342. The strap 330 is then looped around and underneath the second tube 342 and up over the top of the first tube 338, as shown in FIG. 12C. The second tube 342 is then inflated with water. The strap 330 is then connected to the "D" buckle 332 disposed at the proximal end 334 of the strap 330 and the strap 330 tightened to secure the first and second tubes 338, 342 together. Caution should be asserted, however, to not overtighten the strap 330 and cause a pinching of the tubes 338, 342.

Thus, at this stage, the dike includes two tubes 338, 342, with a strap 330 woven around and between the tubes 338, 342 and tightened at the first "D"buckle 332. The strap 330 includes adjacent portions which extend subjacent the first tube 338, upward between the two tubes 338, 342, about the perimeter of the second tube 342, upward again between the two tubes 338, 342, and over the first tube 338, the free end of the strap 330 being tightened at the first buckle 332. It will be appreciated by those of skill in the art that if it is not necessary to further increase the height of the dike, no further tubes need be added, and the second buckle 336 is unnecessary. If, however, it is desirable to further increase the height of the dike, additional tubes may be added as set forth in the following method.

Figure 12E:
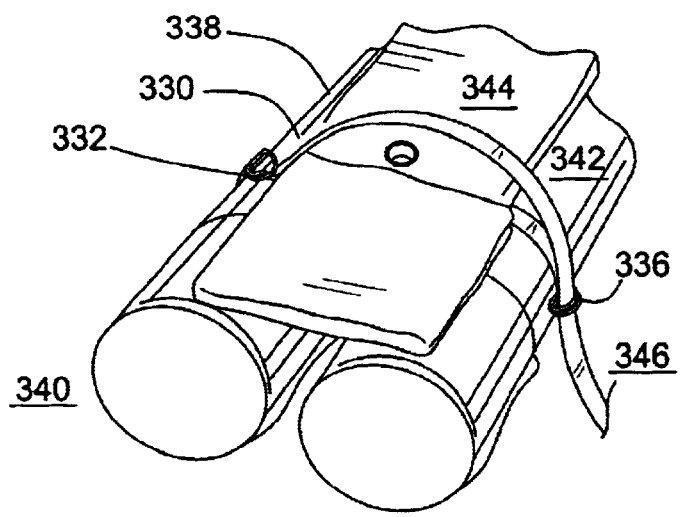
Figure 12F:
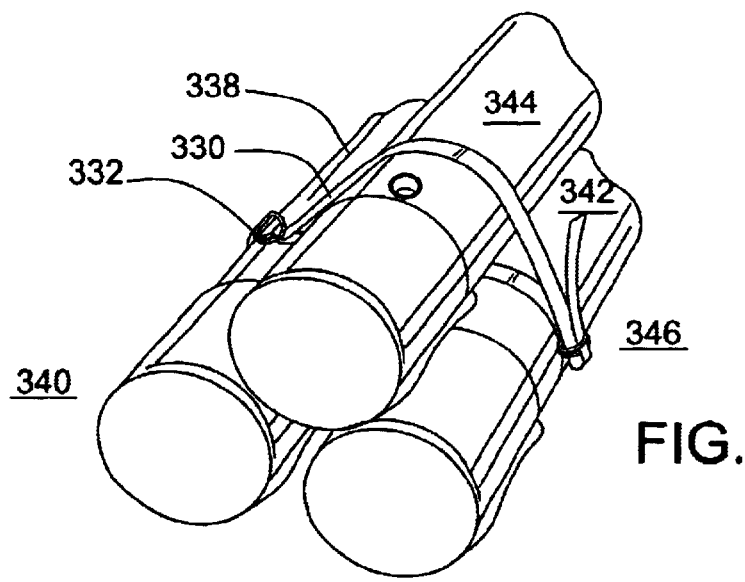

As shown in FIG. 12E, a third tube 344 may then be rolled out on the top of and in the middle of the two base tubes 338, 342. The end of the strap 330 is then placed over the top of the third tube 344 and loosely connected to the other buckle 336. The third tube 344 is then inflated with water and the strap 330 tightened over the third tube 344, as shown in FIG. 12F, again being careful not to overtighten the strap. Thus, the three tubes, 338, 342, 344 coupled with the straps 330 spaced along their length provides an effective dike system to contain floodwaters.

If a taller dike section is required, as may be the case with advancing floodwaters, for example, the illustrated three tube pyramid configuration may be expanded to a configuration which includes six, ten, or more tubes by adding and connecting additional tubes along the dry side (shown generally as 346) of the dike section. In order to couple added tubes to the three tube pyramid base, closed-loop bands 348, preferably of the same material as the strap 330, are provided. In the illustrated embodiment, the bands 348 are circular and have a circumference which is roughly the same as that of the tubes to be added. Thus, with the preferred 19" diameter tubes, the bands 348 will have a circumference on the order of 59 inches.

Figure 14A:
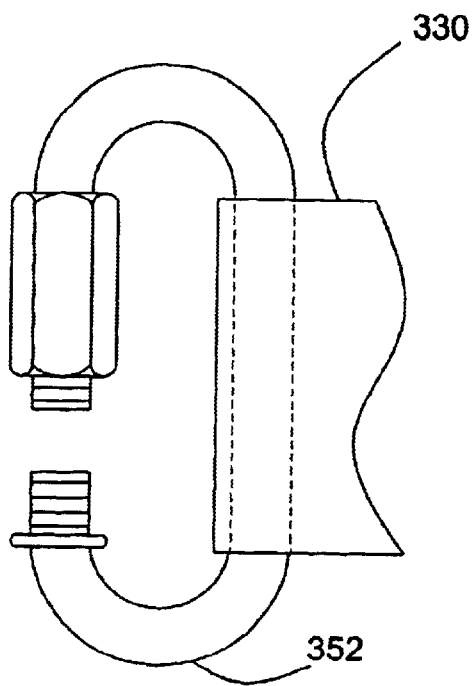
FIGS. 14A and 14B are enlarged views of a quick link engaged between adjacent band and strap.
Figure 14B:
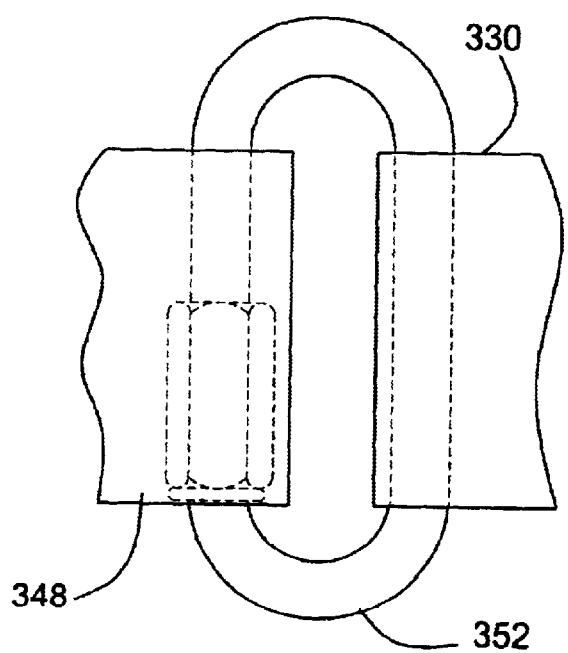

In order to ensure that the added tubes maintain their positions relative to each other and the original dike section tubes 338, 342, 344, connectors 352 are provided. While alternate connector 352 designs may be utilized, the preferred coupler design is that of a conventional ⅜-inch quick link 352, available from most hardware stores. It has been found that such quick link 352 provide adequate strength, and are easily coupled to the already positioned strap 330 and the band 348 disposed about an uninflated tube to quickly and effectively couple added tubes to the base dike section, as shown in FIGS. 14A and 14B, and as will be described with reference to FIGS. 12G–M. While the use of the band 348 and connector 352 arrangement is explained with regard to the application of the fourth and subsequent tubes, it will be appreciated that the band and connector arrangement might alternately have been utilized to couple the third tube 344 to the first and second tubes 338, 342 in lieu of the strap 330 and second buckle 336 arrangement described above. It is preferable, however, that the initial dike structure coupled by the strap 330 include three tubes 338, 342, 344 as disclosed above.

Figure 12G:
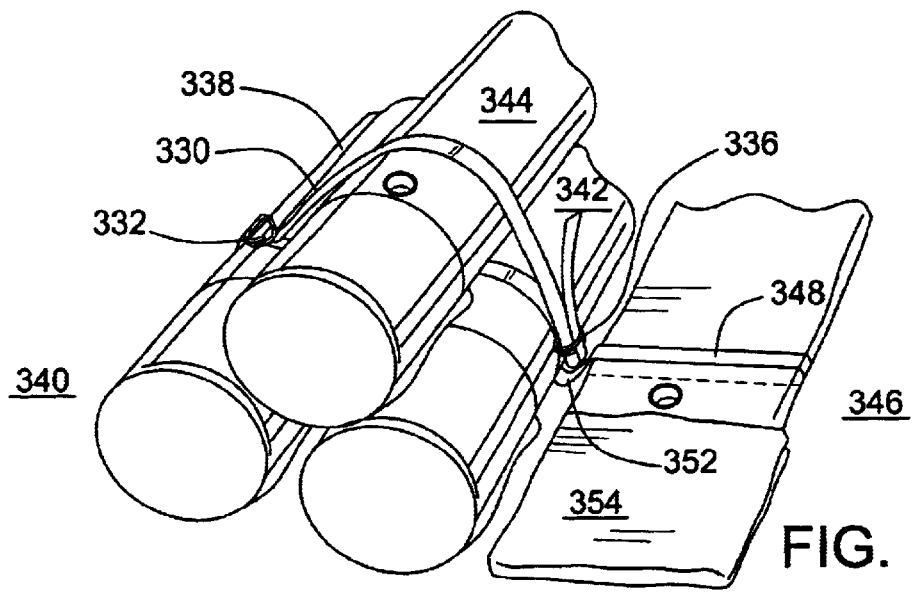

During expansion of the dike section, a fourth tube 354 is rolled out parallel to the second tube 342 along the dry side 346 of the dike section as shown in FIG. 12G. Circular bands 348 are then disposed about tube 354 at positions adjacent the straps 330. A quick link connector 352 is then placed about the strip 330, about the second tube 342 and the band 348 about the added, fourth tube 354.

Figure 12H:
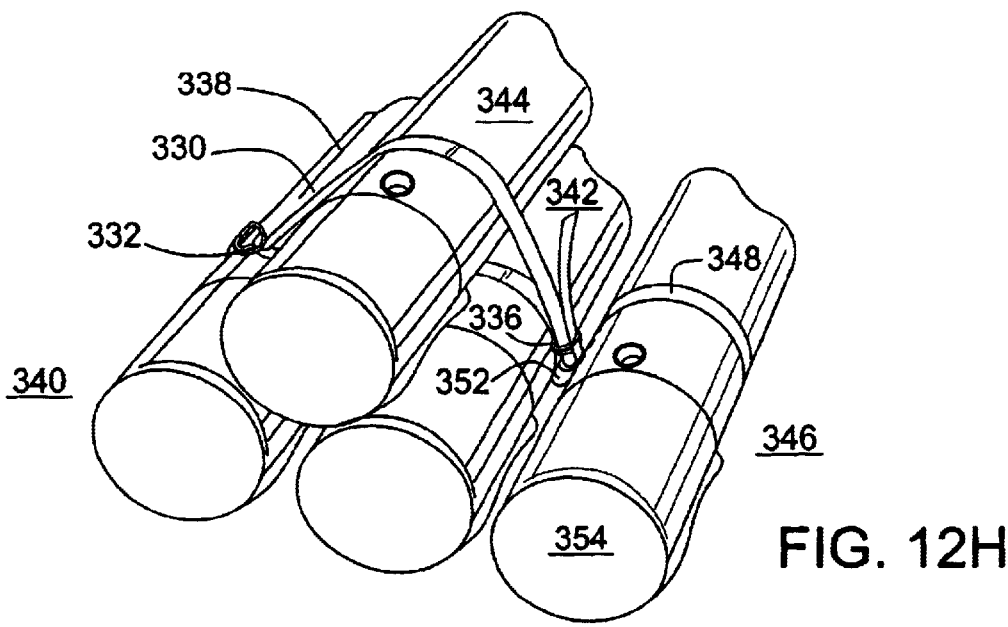
Figure 12:
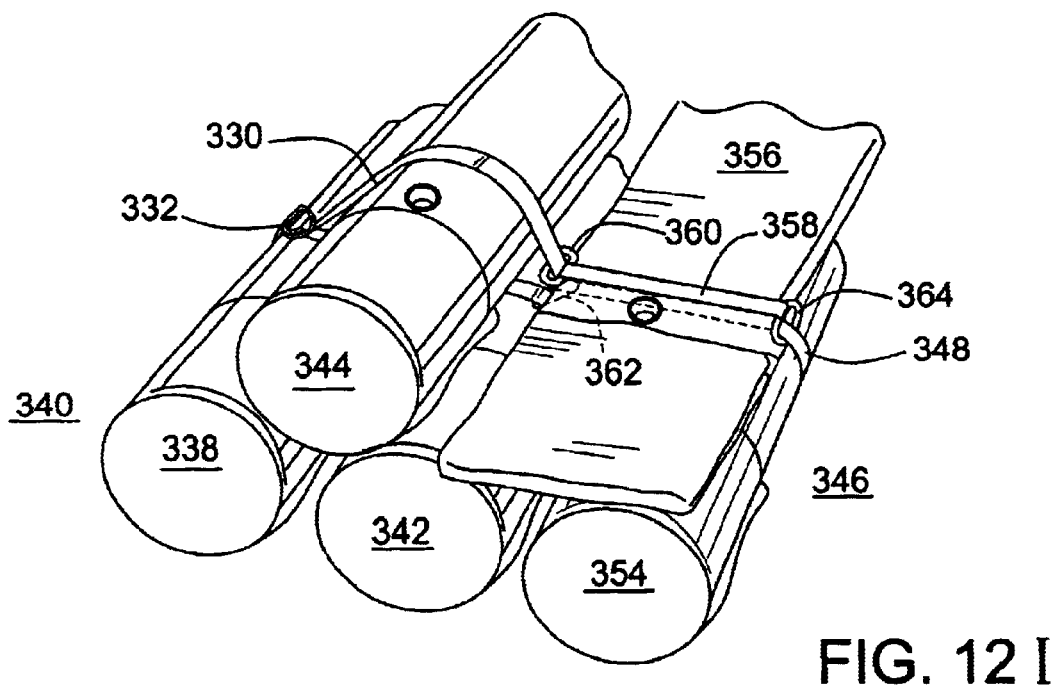
FIG. 12M is a schematic end view of the dike of FIG. 12L expanded to include four additional tubes, the original three base tubes being shown with cross-hatching.
Figure 12J:
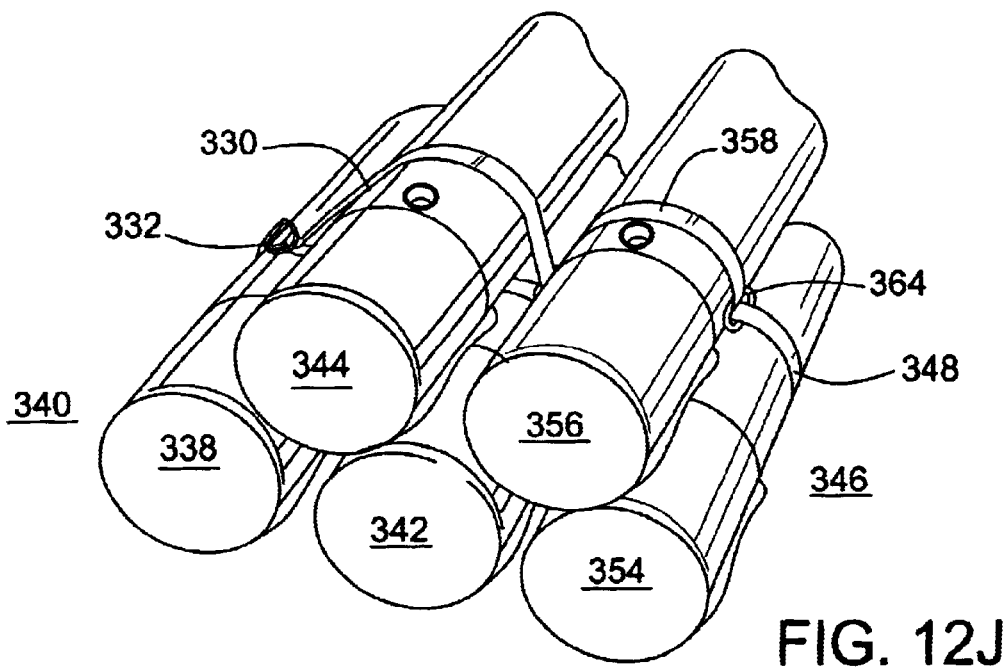
Figure 12:
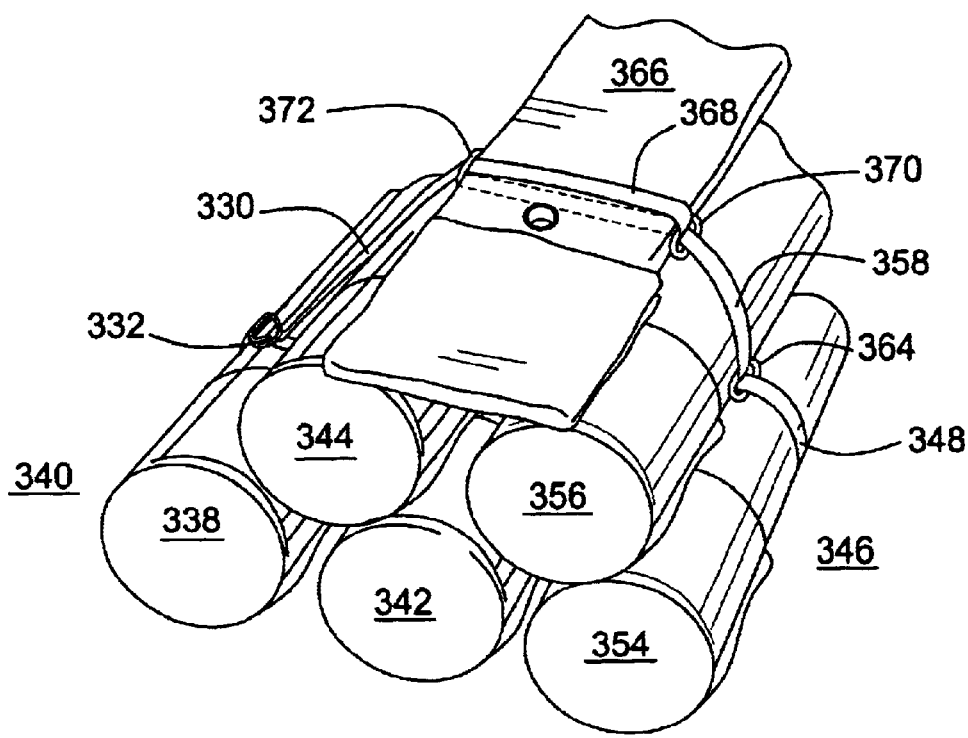
Figure 12:
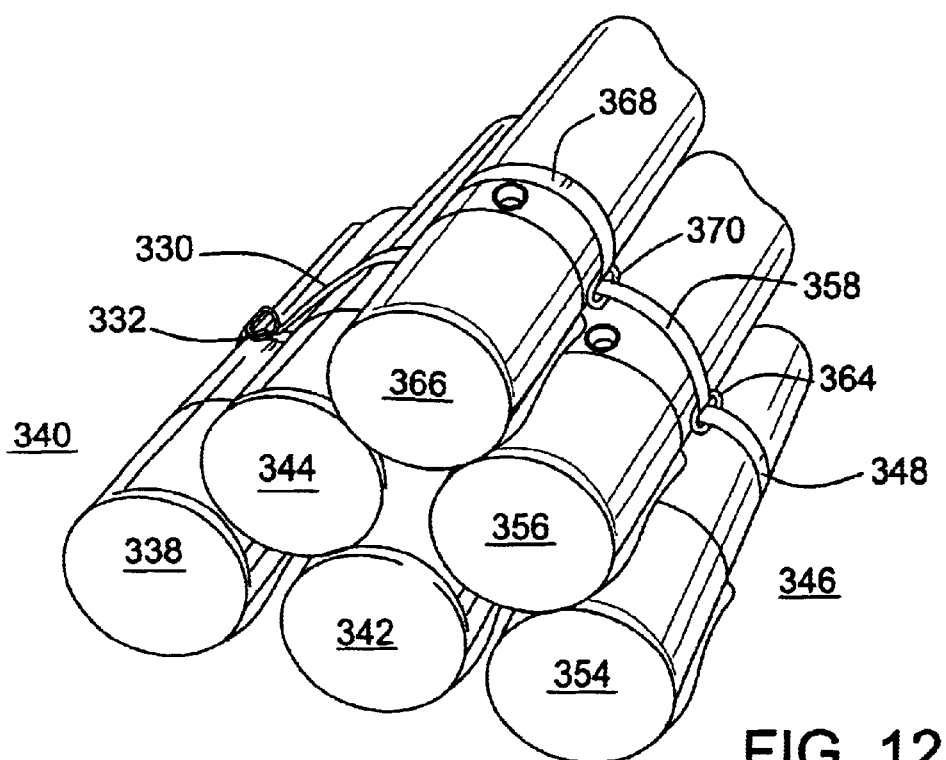
Figure 12:
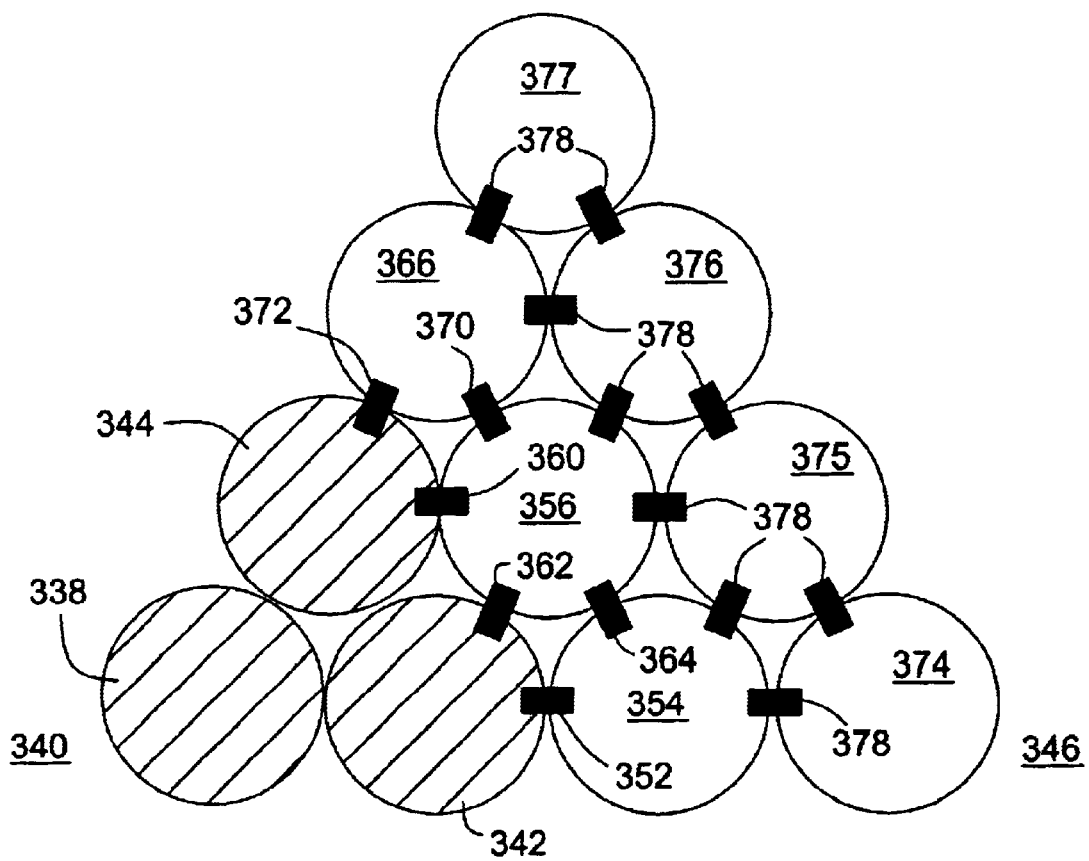

The fourth tube is then inflated with water, as shown in FIG. 12H. A fifth tube 356 is then disposed along the top of the second and fourth tubes 342, 354 and circular bands 358 disposed about the fifth tube 356 substantially adjacent the straps 330 and bands 348. Quick link couplers 360, 362, 364 are used to couple the band 358 to the strap 330 (about the second and third tubes 342, 344) and the band 348 (about the fourth tube 354), respectively, as shown in FIG. 12I. The fifth tube 356 is then inflated, as shown in FIG. 12J.

A sixth tube 366 is then rolled out along the top of the third and fifth tubes 344, 356 and bands 368 disposed about the sixth tube 366 adjacent the straps 330 on the third tube 366 and the bands 358 about the fifth tube 356. As with the fourth and fifth tubes 354, 356, quick link couplers 370, 372 are used to couple the band 368 of the sixth tube 366 to the strap 330 (about the third tube 366) and the band 358 (about the fifth tube 356), respectively, as shown in FIG. 12K. The sixth tube 366 is then inflated to form the six-tube pyramid, as shown in FIG. 12L.

It will be appreciated by those of skill in the art that additional tubes may be added to further increase the height of the dike. By adding four additional tubes 374, 375, 376, 377, as shown schematically in FIG. 12M, for example, the dike can be increased to ten tubes with a corresponding increase in height. As may be seen in FIG. 12M, in adding tubes 374–77, additional quick link couplers 378 are utilized to couple the additional tubes 374–77 together and to the existing six tube pyramid.

Referring to FIG. 9, it has been found that the functioning of the dike section 230e can be enhanced by placing a wrap 258a over the entire length of the dike section. Wrap 258a preferably extends from at least a portion of the way beneath the dike section (i.e., between the dike section and the ground surface 37 on which it is placed) over the containment side of the dike section to a position above the level of the fluid 260 to be contained.

Where a greater strength dike is required, another sheet of substantially liquid-tight material 262 is extended over the containment side of the dike section to extend out a selected distance from the dike over the ground surface on which the dike section is placed. It has been found that for a flow at depths of about 6 feet, a sheet of material extending about 10 to 15 feet from the dike increases the strength of the dike.

It will be apparent that many other changes may be made to the illustrative embodiments, while falling within the scope of the invention and it is intended that all such changes be covered by the claims appended hereto.

What is claimed is:

1. A method of constructing a section of an elongated dike, said method comprising the steps of
   positioning a first elongated, uninflated tube along an axis substantially coincident with a desired dike location,
   positioning at least one elongated strap having a first buckle at a first end along an axis substantially perpendicular to the desired dike location,
   disposing the strap subjacent the first uninflated tube with the first end of the strap extending outward from one side of the first tube and a portion of the strap extending outward from the opposite side of the first tube, the portion of the strap extending from said opposite side of the first tube and which is not disposed about any tube defining a free portion of the strap,
   filling the first tube with liquid to inflate the first tube,
   positioning a second elongated, uninflated tube parallel to and along side the first tube opposite the first end of the strap,
   disposing the free portion of the strap over the top of, down and subjacent the second uninflated tube,
   disposing the free portion of the strap over the top of the first tube,
   loosely coupling the free portion of the strap with the first buckle,
   filling the second tube with liquid to inflate the second tube, and
   tightening the strap through the first buckle to secure the first and second tubes together to form a dike section.

2. The method of claim 1 further comprising the steps of
   positioning at least one additional elongated, uninflated tube parallel to and adjacent at least one of the other tubes,
   positioning a first band about the at least one additional tube substantially adjacent the strap,
   positioning at least one connector about the first band and the adjacent strap or a second band to couple the first band and either the strap or the second band together, and
   filling the at least one additional tube with liquid to inflate the at least one additional tube.

3. The method of claim 1 wherein at least one of the tubes is sealed along its ends, and the method further comprises the steps of
   folding at least one of the ends of the at least one tube over,
   positioning an elongated sleeve over the folded tube end such that a portion of the sleeve extends beyond the folded tube end, and folding the portion of the sleeve extending beyond the folded tube end under said tube.

4. The method of claim 1 further comprising the step of coupling an end of at least one of said tubes to an end of a third tube laid along the axis of the at least one tube and end to end, said step of coupling including the steps of overlapping the end of the at least one tube with the end of the third tube, folding the end of the at least one tube and the end of the third tube over on the at least one tube, folding the end of the at least one tube and the end of the third tube over on the third tube, positioning an elongated sleeve over the folded ends of the at least one tube and the third tube.

5. The method of claim 1 wherein the tubes are substantially circular when inflated and have a mean diameter, and the step of positioning the strap subjacent the first tube comprises the step of positioning the strap such that the first end extends outward from the tube on the order of one-quarter to one-half of the mean diameter.

6. The method of claim 1 wherein the buckles are "D" buckles.

7. The method of claim 1 further comprising the steps of positioning a plurality of said elongated straps spaced from and in a substantially parallel relationship to a first such strap, disposing the straps subjacent the first uninflated tube with the first ends of the straps extending outward from one side of the first tube and a portion of the straps extending outward from the opposite side of the first tube, positioning said second elongated, uninflated tube parallel to and along side the first tube opposite the first end of the straps, disposing the free portion of the straps over the top of, down and subjacent the second uninflated tube, disposing the free portion of the straps over the top of the first tube, loosely coupling the free portion of the straps with the first buckles, tightening the straps through the first buckles to secure the first and second tubes together to form a dike section.

8. A method of constructing a section of an elongated dike, said method comprising the steps of positioning a first elongated, uninflated tube along an axis substantially coincident with a desired dike location, positioning at least one elongated strap having a first buckle at a first end and a second buckle spaced from the first end along an axis substantially perpendicular to the desired dike location, disposing the strap subjacent the first uninflated tube with the first end of the strap extending outward from one side of the first tube and the second buckle disposed along the opposite side of the first tube and a portion of the strap extending outward from the opposite side of the first tube, the portion of the strap extending from said opposite side of the first tube and which is not disposed about any tube defining a free portion of the strap, filling the first tube with liquid to inflate the first tube, positioning a second elongated, uninflated tube parallel to and along side the first tube opposite the first end of the strap, disposing the free portion of the strap over the top of, down and subjacent the second uninflated tube such that the second buckle is disposed and accessible along a surface of the second uninflated tube, disposing the free portion of the strap over the top of the first tube, loosely coupling the free portion of the strap with the first buckle, filling the second tube with liquid to inflate the second tube, tightening the strap through the first buckle to secure the first and second tubes together to form a dike section, positioning a third elongated, uninflated tube parallel to and along the top of the first and second tubes, disposing the free portion of the strap over the top of the third uninflated tube, loosely coupling the free portion of the strap with the second buckle, filling the third tube with liquid to inflate the third tube, and tightening the strap through the second buckle to secure the third tube to the first and second tubes.

9. The method of claim 8 further comprising the steps of positioning a fourth elongated, uninflated tube parallel to and along side the second tube, positioning a band about the fourth tube substantially adjacent the strap, positioning a connector about the band and the adjacent strap to couple the band and the strap together, and filling the fourth tube with liquid to inflate the fourth tube.

10. The method of claim 9 further comprising the steps of positioning a fifth elongated, uninflated tube along upper surfaces of the second and fourth tubes, positioning a second band about the fourth tube substantially adjacent the strap and the band about the fourth tube, positioning at least one connector about the second band and the adjacent strap of the band about the fourth tube to couple the second band and either the strap or the band about the fourth tube together, and filling the band about the fourth tube together, and filling the fourth tube with liquid to inflate the fourth tube.

11. The method of claim 10 further comprising the steps of positioning a sixth elongated, uninflated tube along upper surfaces of the third and fifth tubes, positioning a third band about the fifth tube substantially adjacent the strap and the second band, positioning at least one connector about the third band and the adjacent strap or second band to couple the third band and either the strap or the second band together, and filling the fifth tube with liquid to inflate the fifth tube.

12. The method of claim 11 further comprising the steps of positioning at least one additional elongated, uninflated tube parallel to and adjacent at least one of the other tubes, positioning a fourth band about the at least one additional tube substantially adjacent the strap or one of the previously positioned bands, positioning at least one connector about the fourth band and the adjacent strap or previously positioned band to couple the fourth band and either the strap or the previously positioned band together, and filling the at least one additional tube with liquid to inflate the at least one additional tube.

13. The method of claim 8 wherein the step of positioning the strap subjacent the first tube further comprises the step of positioning the strap such that the second buckle is disposed along the free portion a distance from the first tube on the order of 80% to 120% of the mean diameter.

14. A method of constructing a section of an elongated dike, said method comprising the steps of positioning a first elongated, uninflated tube along an axis substantially coincident with a desired dike location, positioning at least one elongated strap along an axis substantially perpendicular to the desired dike location, positioning a plurality of said elongated straps spaced from and in a substantially parallel relationship to a first such strap, said straps each having a first buckle at a first end and a second buckle spaced from the first end along said axis substantially perpendicular to the desired dike location, disposing the straps subjacent the first uninflated tube with the first ends of the straps extending outward from one side of the first tube and a portion of the straps extending outward from the opposite side of the first tube, the second buckles disposed along the opposite side of the first tube from the first ends, the portion of the straps extending from said opposite side of the first tube and which is not disposed about any tube defining free portions of the straps, filling the first tube with liquid to inflate the first tube, positioning a second elongated, uninflated tube parallel to and along side the first tube opposite the first end of the straps, disposing the free portion of the straps over the top of, down and subjacent the second uninflated tube such that the second buckles are disposed and accessible along a surface of the second uninflated tube, disposing the free portion of the straps over the top of the first tube, loosely coupling the free portion of the straps with the first buckle, filling the second tube with liquid to inflate the second tube, tightening the straps through the first buckles to secure the first and second tubes together to form a dike section, positioning a third elongated, uninflated tube parallel to and along the top of the first and second tubes, disposing the free portions of the straps over the top of the third uninflated tube, loosely coupling the free portions of the straps with the second buckles, filling the third tube with liquid to inflate the third tube, and tightening the straps through the second buckles to secure the third tube to the first and second tubes.

15. The method of claim 14 wherein the step of positioning the plurality of elongated straps comprises the step of positioning said straps on the order of six feet apart or less.

16. A method of constructing a section of an elongated dike comprising a plurality of inflated elongated tubes having ends, the method comprising the steps of folding over an end of at least one of said tubes when said tube is in an uninflated state, positioning an elongated sleeve over the folded end such that a portion of the sleeve extends beyond the folded end, folding the portion of the sleeve extending beyond the folded end under said tube, and filling said at least one tube with water.

17. A method of constructing a section of an elongated dike comprising a plurality of inflated elongated tubes having ends, the method comprising the steps of overlapping the end of a first said tube with the end of a second said tube, folding the end of the first tube and the end of the second tube over on the first tube, folding the end of the first tube and the end of the second tube over on the second tube, positioning an elongated sleeve over the folded ends of the first and second tubes to couple the ends of the first and second tubes together, and filling said first and second tubes with water.

18. A section of an elongated dike comprising at least first and second elongated, inflated tubes each having an axis, said tubes being disposed adjacent one another with the axes parallel, said inflated tubes each having an outer perimeter, said tubes being inflated with fluid, at least one elongated strap having first and second ends, and at least a first buckle, said first buckle being disposed at said first end of the strap, said elongated strap being disposed substantially perpendicular said axes, a first portion of said strap being disposed subjacent the first tube, a second portion of said strap adjacent the first portion and being disposed between said first and second tubes, a third portion of said strap adjacent the second portion and being disposed substantially about said second tube outer perimeter, and a fourth portion of said strap adjacent the third portion and being disposed over the first tube and engaged with said first buckle such that the elongated strap is disposed about the first and second tubes in a figure eight configuration.

19. The section of an elongated dike as claimed in claim 18 wherein the strap is a polyester mesh strap.

20. A section of an elongated dike comprising at least first and second elongated, inflated tubes each having an axis, said tubes being disposed adjacent one another with the axes parallel, said inflated tubes each having an outer perimeter, at least one elongated strap having first and second ends, and at least a first buckle, said first buckle being disposed at said first end of the strap, said elongated strap being disposed substantially perpendicular said axes, a portion of said strap being disposed subjacent the first tube, a second portion of said strap adjacent the first portion and being disposed between said first and second tubes, a third portion of said strap adjacent the second portion and being disposed substantially about said second tube outer perimeter, and a fourth portion of said strap adjacent the third portion and/being disposed over the first tube and engaged with said first buckle a third elongated, inflated tube having an axis disposed parallel said first and second tube axes and having an upper surface, at least a portion of the first and second tubes being disposed subjacent the third tube, the elongated strap further comprising a fifth portion adjacent the fourth portion and extending from the first buckle, and a second buckle spaced along the strap away from the first buckle and coupled to the third portion, the second buckle being disposed along the second tube, the fifth portion of strap being disposed along the upper surface of the third tube and engaged with said second buckle.

21. The section of an elongated dike as claimed in claim 20 further comprising at least a fourth elongated, inflated tube having an axis disposed parallel said first, second, and third axes and having a perimeter, a closed-loop band disposed about the perimeter of the fourth tube substantially adjacent the strap, and a connector coupling the band to the strap.

22. The section of an elongated dike as claimed in claim 21 further comprising at least a fifth elongated, inflated tube having an axis disposed parallel said first, second, third and fourth axes and having a perimeter, a second closed-loop band disposed about the perimeter of the fifth tube substantially adjacent at least one of the strap or the first band, at least one connector coupling the second band to at least one of the first band or the strap.

23. The section of an elongated dike as claimed in claim 21 further comprising at least ten elongated, inflated tubes having axes disposed parallel one another, at least a portion of the tubes each having a perimeter and a closed-loop band disposed about said perimeter of said tube substantially adjacent at least one of the strap or another band, at least one connector coupling each said band to at least one of said another band or the strap.

24. The section of an elongated dike as claimed in claim 21 wherein the connector is a quick link connector.

25. A section of an elongated dike comprising
at least first and second elongated, inflated tubes each having and axis, said tubes being disposed adjacent one another with the axes parallel, said inflated tubes each having an outer perimeter,
at least one elongated strap having first and second ends, and a least a first buckle, said first buckle being disposed at said first end of the strap,
said elongated strap being disposed substantially perpendicular said axes, a portion of said strap being disposed subjacent the first tube, a second portion of said strap adjacent the first portion and being disposed between said first and second tubes, a third portion of said strap adjacent the second portion and being disposed substantially about said second tube outer perimeter, a fourth portion of said strap adjacent the third portion and being disposed over the first portion and engaged with said first buckle,
at least a third elongated, inflated tube having an axis disposed parallel said first and second axes and having a perimeter,
a closed-loop band disposed about the perimeter of the third tube substantially adjacent the strap, and
a connector coupling the band to the strap.

26. A section of an elongated dike comprising
at least first and second elongated, inflated tubes each having an axis, said tubes being disposed adjacent one another with the axes parallel, said inflated tubes each having an outer perimeter, at least one of said tubes having a cylindrical shape with ends, at least one of said ends being folded over,
at least one cylindrical sleeve open along at least one end, said open end being concentrically disposed about said folded over tube end, said sleeve having a length that is not disposed about the folded over tube end, said length being folded under and disposed subjacent said at least one said tube,
at least one elongated strap having first and second ends, and at least a first buckle, said first buckle being disposed at said first end of the strap,
said elongated strap being disposed substantially perpendicular said axes, a portion of said strap being disposed subjacent the first tube, a second portion of said strap adjacent the first portion and being disposed between said first and second tubes, a third portion of said strap adjacent the second portion and being disposed substantially about said second tube outer perimeter, and a fourth portion of said strap adjacent the third portion and being disposed over the first portion and engaged with said first buckle.

27. A section of an elongated dike comprising
at least first and second elongated, inflated tubes each having an axis, said tubes being disposed adjacent one another with the axes parallel, said inflated tubes each having an outer perimeter,
at least one elongated strap having first and second ends, and at least a first buckle, said first buckle being disposed at said first end of the strap,
said elongated strap being disposed substantially perpendicular said axes, a portion of said strap being disposed subjacent the first tube, a second portion of said strap adjacent the first portion and beg disposed between said first and second tubes, a third portion of said strap adjacent the second portion and being disposed substantially about said second tube outer perimeter, and a fourth portion of said strap adjacent the third portion and being disposed over the first tube and engaged with said first buckle such that the elongated strap is disposed about the first and second tubes in a figure eight configuration, and
a cylindrical sleeve and at least two elongated, inflated tubes disposed in divergent positions, each said divergently positioned tube having a cylindrical shape with at least one tube end, each said tube end being folded over to define a folded end portion and a tube body, said tube folded end portions being engaged with one another such that said bodies diverge from one another, said cylindrical sleeve being concentrically disposed about said tube folded end portions whereby said sleeve maintains the relative positions of the tube folded end portions.

28. A section of an elongated dike comprising
at least first and second elongated, inflated tubes each having an axis, said tubes being disposed adjacent one another with the axes parallel, said inflated tubes each having an outer perimeter,
at least one elongated strap having first and second ends, and at least a first buckle, said first buckle being disposed at said first end of the strap,
said elongated strap being disposed substantially perpendicular said axes, a portion of said strap being disposed subjacent the first tube, a second portion of said strap adjacent the first portion and being disposed between said first and second tubes, a third portion of said strap adjacent the second portion and being disposed substantially about said second tube outer perimeter, and a fourth portion of said strap adjacent the third portion and being disposed over the first portion and engaged with said first buckle,
a cylindrical sleeve,
at least two elongated, inflated tubes disposed in divergent positions, each said divergently positioned tube having a cylindrical shape with at least one tube end, each said tube end of said tubes disposed in divergent positions being folded over to define a folded end portion and a tube body, said tube folded end portions being engaged with one another such that said bodies diverge from one another, said cylindrical sleeve being concentrically disposed about said tube folded end portions whereby said sleeve maintains the relative positions of the tube folded end portions, at least one said tube disposed in divergent positions having a second end, said second end being folded over, and a second cylindrical sleeve open along at least one end, said second sleeve open end being concentrically disposed about said second tube folded over end, said second sleeve having a length that is not disposed about the second tube folded over end, said length being folded under and disposed subjacent said at least one said tube.

29. A section of an elongated dike comprising at least first and second elongated, inflated tubes each having an axis, said tubes being disposed adjacent one another with the axes parallel, said inflated tubes each having an outer perimeter, a plurality of elongated straps each having first and second ends, and at least a first buckle, said first buckle being disposed at said first end of the strap, said elongated straps being disposed substantially perpendicular said axes and spaced from one another along the length of the first and second tubes, a portion of each said strap being disposed subjacent the first tube, a second portion of each said strap adjacent the first portion and being disposed between said first and second tubes, a third portion of each said strap adjacent the second portion and being disposed substantially about said second tube outer perimeter, and a fourth portion of each said strap adjacent the third portion and being disposed over the first portion and engaged with said first buckle.

30. The section of an elongated dike as claimed in claim 29 further comprising a third elongated, inflated tube having an axis disposed parallel said first and second tube axes and having an upper surface, at least a portion of the first and second tubes being disposed subjacent the third tube, and wherein each said elongated strap further comprises a fifth portion adjacent the fourth portion and extending from the first buckle, and a second buckle spaced along each said strap away from the first buckle and coupled to the third portion, the second buckles being disposed along the second tube, the fifth portion of each said strap being disposed along the upper surface of the third tube and engaged with said second buckle of each said strap.

31. A section of an elongated dike comprising a plurality of elongated, inflated tubes disposed parallel one another, at least one said tube having a cylindrical shape with at least one tube end, said tube end being folded over, said section further comprising at least one cylindrical sleeve open along at least one end, said open end being concentrically disposed about said folded over tube end, said sleeve having a length that is not disposed about the folded tube end, said length being folded under and disposed subjacent said at least one said tube whereby said sleeve maintains the tube end in a folded over configuration.

32. A section of an elongated dike comprising a cylindrical sleeve and at least two elongated, inflated tubes, each said tube having a cylindrical shape with at least one tube end, each said tube end being folded over to define a folded end portion and a tube body, said folded end portions being engaged with one another such that said bodies diverge from one another, said cylindrical sleeve being concentrically disposed about said engaged folded end portions whereby said sleeve maintains the relative positions of the engaged folded end portions.

33. A section of an elongated dike comprising a cylindrical sleeve and at least two elongated, inflated tubes, each said tube having a cylindrical shape with at least a first tube end, at least one said tube having a second tube end, each said first tube end being folded over to define a folded end portion and a tube body, said folded end portions being engaged with one another such that said bodies diverge from one another, said cylindrical sleeve being concentrically disposed about said folded end portions whereby said sleeve maintains the relative positions of the folded end portions, said second tube end being folded over, a second cylindrical sleeve open along at least one end, said second sleeve open end being concentrically disposed about said second folded over tube end, said second sleeve having a length that is not disposed about the second folded over tube end, said length being folded under and disposed subjacent said at least one said tube.

* * * * *